United States Patent
Kudo

(10) Patent No.: US 8,224,550 B2
(45) Date of Patent: Jul. 17, 2012

(54) STEERING ASSIST SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 620 days.

(21) Appl. No.: 12/392,569

(22) Filed: Feb. 25, 2009

(65) Prior Publication Data

US 2009/0216405 A1 Aug. 27, 2009

(30) Foreign Application Priority Data

Feb. 27, 2008 (JP) ................. 2008-046192

(51) Int. Cl.
*G05D 1/00* (2006.01)

(52) U.S. Cl. .............. 701/96; 701/93; 701/41; 180/170; 180/443; 340/903; 340/435; 340/436

(58) Field of Classification Search .................... 701/96, 701/41, 301; 180/170; 340/903, 435, 436
See application file for complete search history.

(56) References Cited

U.S. PATENT DOCUMENTS

| 5,410,346 A | 4/1995 | Saneyoshi et al. | |
| 6,665,603 B2 * | 12/2003 | Jindo et al. | ...... 701/96 |
| 2006/0235598 A1 | 10/2006 | Kudo | |
| 2006/0239509 A1 | 10/2006 | Saito | |
| 2007/0233343 A1 * | 10/2007 | Saito et al. | ...... 701/41 |

FOREIGN PATENT DOCUMENTS

| JP | 5-114099 | 5/1993 |
| JP | 5-265547 | 10/1993 |
| JP | 6-266828 | 9/1994 |
| JP | 10-283461 | 10/1998 |
| JP | 10-283477 | 10/1998 |
| JP | 2005-332192 | 12/2005 |
| JP | 2006-298008 | 11/2006 |
| JP | 2006-331389 | 12/2006 |
| JP | 2007-261449 | 10/2007 |

* cited by examiner

*Primary Examiner* — Lesley D Morris
*Assistant Examiner* — Jacob Knutson
(74) *Attorney, Agent, or Firm* — Smith, Gambrell & Russell, LLP

(57) ABSTRACT

A steering assist system includes traffic-line detecting means for detecting right and left traffic lines marked on a road, preceding-vehicle detecting means for detecting a preceding vehicle traveling ahead of a subject vehicle, traveling-target-point setting means for setting a traveling target point for traveling of the subject vehicle at a predetermined position in the preceding vehicle when the preceding vehicle is not within predetermined ranges from the right and left traffic lines, and for setting the traveling target point at a position offset from the predetermined position in the preceding vehicle toward the center of a traveling lane of the subject vehicle when the preceding vehicle is within the predetermined range of any one of the right and left traffic lines, and steering control means for controlling steering so that the subject vehicle passes over the traveling target point.

14 Claims, 16 Drawing Sheets

STEERING ASSIST SYSTEM

CROSS-REFERENCE TO RELATED APPLICATIONS

The disclosure of Japanese Patent Application No. 2008-046192 filed on Feb. 27, 2008 including the specification, drawings and abstract is incorporated herein by reference in its entirety.

BACKGROUND OF THE INVENTION

1. Field of the Invention

The present invention relates to steering assist systems, and more particularly, to a steering assist system that controls steering so that a subject vehicle can follow a preceding vehicle.

2. Description of the Related Art

In recent years, steering assist systems have been developed. In steering assist systems, a preceding traveling ahead of a subject vehicle is detected by analyzing an image taken by an image taking means, such as a stereo camera, or analyzing reflected waves of radio waves emitted from a radar apparatus, and the steering angle and so on of the subject vehicle are automatically controlled so that the subject vehicle can follow the preceding vehicle (for example, see Japanese Unexamined Patent Application Publication No. 2006-298008).

In a steering assist system disclosed in Japanese Unexamined Patent Application Publication No. 2007-261449, when there is no preceding vehicle, the steering angle and so on of a subject vehicle are automatically controlled on the basis of information about traffic lines detected on the right and left sides of the subject vehicle so that the subject vehicle will not deviate from the traffic lines. Another type of steering assist system has been developed in which the aim of steering assist is switched from preceding vehicle follow-up to traffic line follow-up when a preceding vehicle travels far from a subject vehicle (for example, see Japanese Unexamined Patent Application Publication No. 2005-332192).

In the present invention, continuous lines and broken lines marked on the road surface, for example, a road center line such as a no-passing line, and a separating line for separating a side strip and a roadway, are referred to as traffic lines, and a region defined by two traffic lines on the road is referred to as a traveling lane.

In a case in which the preceding vehicle is traveling close to or over the right or left traffic line, when steering assist is continued so that the subject vehicle follows the preceding vehicle, the subject vehicle is also going to travel close to or over the right or left traffic line. This gives the driver a feeling of insecurity.

However, for example, when the aim of steering assist is switched from preceding-vehicle follow-up to traffic-line follow-up in order to avoid the above-described problem, since a traveling target point, that is, a point defined in real space so as to determine the traveling route of the subject vehicle is set in the center of the traveling lane of the subject vehicle in normal traffic-line follow-up control, the traveling target point is rapidly switched from the preceding vehicle near the traffic line to the center of the traveling lane.

For this reason, the subject vehicle that has been traveling close to the right or left traffic line rapidly turns its traveling direction toward the center of the traveling lane. Therefore, the driver feels as if the subject vehicle was pulled back toward the center of the traveling lane. This gives the driver a feeling of discomfort.

SUMMARY OF THE INVENTION

The present invention has been made in view of these circumstances, and it is an object of the present invention to provide a steering assist system that allows preceding-vehicle follow-up with a traveling target point set at an appropriate position without giving the driver any feeling of insecurity and discomfort even when a preceding vehicle is traveling close to or over a traffic line.

In order to solve the above-described problems, a steering assist system according to an aspect of the present invention includes traffic-line detecting means for detecting right and left traffic lines marked on a road; preceding-vehicle detecting means for detecting a preceding vehicle traveling ahead of a subject vehicle; traveling-target-point setting means for setting a traveling target point for traveling of the subject vehicle at a predetermined position in the preceding vehicle when the preceding vehicle is not within predetermined ranges from the traffic lines, and for setting the traveling target point at a position offset from the predetermined position in the preceding vehicle toward the center of a traveling lane of the subject vehicle when the preceding vehicle is within the predetermined range of one of the right and left traffic lines; and steering control means for controlling steering so that the subject vehicle passes over the traveling target point.

In this case, on the basis of the positional relationship between the preceding vehicle and the right traffic line or the left traffic line, when the preceding vehicle is traveling near the center of the traveling lane apart from the right or left traffic line, a traveling target point is set at a normal setting position. When the preceding vehicle is traveling near or over one of the right and left traffic lines, a traveling target point is set at a position offset from the normal setting position toward the center of the traveling lane. For this reason, the subject vehicle can be caused to follow the preceding vehicle that is traveling near or over the right traffic line or the left traffic line while traveling on a side slightly shifted from the preceding vehicle toward the center of the traveling lane. This allows the subject vehicle to follow the preceding vehicle without giving any feeling of insecurity to the driver.

When the preceding vehicle is traveling near or over the right traffic line or the left traffic line, for example, the traveling target point of the subject vehicle is not set at the center of the traveling lane, but can be offset to a position that prevents the subject vehicle from deviating from the traffic line. Therefore, the traveling direction of the subject vehicle is not rapidly changed, and steering control for following the preceding vehicle can be continued while the traveling target point is determined at an appropriate position, without giving any feeling of discomfort to the driver.

Preferably, the predetermined range extends from a position a predetermined first distance apart from the traffic line in a direction toward the center of the traveling lane of the subject vehicle, to a position a predetermined second distance apart from the traffic line in a direction opposite the center of the traveling lane of the subject vehicle.

In this case, when the preceding vehicle is within the range from the position the first distance apart inward from the right or left traffic line, to the position the second distance apart outward from the traffic line, a target traveling point is set at a position offset from the normal setting position toward the center of the traveling lane. Therefore, the range near the traffic line where the traveling target point is offset is made clear, and the advantage of the above-described advantage of the invention is achieved reliably.

Preferably, an offset amount of the traveling target point is set so that the absolute value of the offset amount increases as the preceding vehicle moves farther away from the center of the traveling lane of the subject vehicle.

In this case, the offset amount of the traveling target point is set so that the absolute value thereof increases as the preceding vehicle moves farther away from the center of the traveling lane of the subject vehicle. Therefore, in a condition in which the preceding vehicle is approaching from the center of the traveling lane toward one of the traffic lines, the subject vehicle can be caused to travel toward a side slightly shifted from the preceding vehicle toward the center of the traveling lane. In a condition in which the preceding vehicle is traveling over the traffic line or almost outside the traffic line, the subject vehicle can be caused to travel toward a side greatly shifted from the preceding vehicle toward the center of the traveling lane. For this reason, steering control for following the preceding vehicle can be naturally performed in a condition suited to the feeling of the driver without giving any feeling of insecurity and discomfort to the driver, and the above-described advantages of the invention can be achieved more effectively.

Preferably, an offset amount of the traveling target point is calculated according to the following expression when the preceding vehicle is traveling near the right traffic line:

$$O_x = -\frac{1100}{1300} \cdot d_{pl}(r) - 1100$$

and the offset amount is calculated according to the following expression when the preceding vehicle is traveling near the left traffic line:

$$O_x = -\frac{1100}{1300} \cdot d_{pl}(l) + 1100$$

where a right side in a width direction of the subject vehicle is a positive side, Ox represents the offset amount, and dpl(r) and dpl(l) respectively represent positions of the preceding vehicle relative to the right and left traffic lines in the width direction of the subject vehicle, and satisfy the following conditions:

$$-1300 \leq dpl(r) \leq 1300$$

$$-1300 \leq dpl(l) \leq 1300$$

In this case, the offset amount of the traveling target point is set according to the above-described expressions so that the absolute value of the offset amount increases in a linear function manner according to the position of the preceding vehicle relative to the traffic line. Therefore, control can be performed so that the subject vehicle can follow the preceding vehicle without running out of the traffic line while giving a more natural feeling to the driver, and the above-described advantages of the invention can be achieved more effectively.

Preferably, the traveling-target-point setting means sets the traveling target point at the predetermined position in the preceding vehicle without offsetting the traveling target point when it is determined that the preceding vehicle is within both the predetermined ranges from the detected right and left traffic lines.

In this case, when the preceding vehicle is within both the predetermined ranges from the right and left traffic lines, this does not mean that the preceding vehicle is close to one of the traffic lines, but means that the lane width of the traveling lane is small. Therefore, the traveling target point is not offset in this case. This allows the subject vehicle to more naturally follow the preceding vehicle, and the above-described advantages of the invention can be achieved more reliably.

Preferably, the traveling-target-point setting means sets the traveling target point at the predetermined position in the preceding vehicle without offsetting the traveling target point when a distance between the detected right and left traffic lines is less than or equal to a preset threshold value.

In this case, when the lane width of the traveling lane is small, the traveling target point is not offset. This allows the subject vehicle to more naturally follow the preceding vehicle, and the above-described advantages of the invention can be achieved more reliably.

Preferably, an offset amount of the traveling target point is corrected so as to increase the absolute value of the offset amount when another vehicle is detected in a traveling lane adjacent to the traveling lane of the subject vehicle across any of the traffic lines.

In addition to the above-described advantages of the invention, since the offset amount of the traveling target point is corrected so as to increase the absolute value thereof when another vehicle is detected in the adjacent traveling lane, the subject vehicle can be kept away from the traffic line, and a feeling of security can be given to the driver. Moreover, safety of steering control for following the preceding vehicle can be improved.

Preferably, when a steering wheel is turned, the traveling-target-point setting means sets the traveling target point at a position offset in an input direction of steering torque input by the turn.

In addition to the above-described advantages of the invention, when the steering wheel is turned by the driver, the traveling target point is set at the position offset in the input direction in which steering torque is input by the turn. Therefore, it is possible to reflect the intention of the driver to adapt driving of the subject vehicle better to the driving environment into steering control for following the preceding vehicle. This can provide more comfort of steering control for following the preceding vehicle.

Preferably, an offset amount of the traveling target point in the input direction of the steering torque is set to be proportional to a time integration value of the input steering torque.

In this case, since the offset amount of the traveling target point in the input direction of the steering torque is set to be proportional to a time integration value of the input steering torque, it is possible to store the history of turns of the steering wheel made by the driver in order to adapt driving of the subject vehicle better to the driving environment. For this reason, steering control for following the preceding vehicle can be achieved in a condition more suited to the preference of the driver, and the above-described advantages of the invention can be achieved effectively.

Preferably, an offset amount of the traveling target point in the input direction of the steering torque is set to be proportional to a value obtained by subjecting the input steering torque to time integration while increasing or decreasing the input steering torque by a fixed value in accordance with the sign of the input steering torque when a state in which the absolute value of the input steering torque is more than or equal to a preset threshold value continues for a predetermined time.

In this case, the offset amount of the traveling target point in the input direction of the steering torque is set to be proportional to a value obtained by subjecting the input steering torque to time integration while increasing or decreasing the input steering torque by a fixed value in accordance with the sign of the input steering torque when a state in which the absolute value of the input steering torque is more than or equal to a preset threshold value continues for a predetermined time. Therefore, it is possible to store the history of turns of the steering wheel made by the driver in order to adapt driving of the subject vehicle better to the driving environment. Moreover, since there is no need to finely adjust the steering angle of the steering wheel in order to adjust the traveling target point, the driver can easily and clearly shift the traveling target point, and the above-described advantages of the invention can be achieved effectively.

Preferably, an offset amount of the target traveling point in the input direction of the steering torque is within a range to a left end or a right end of the preceding vehicle.

In addition to the above-described advantages of the invention, since the offset amount of the target traveling point in the input direction of the steering torque is within a range to the left end or right end of the preceding vehicle, the traveling target point is set within the range between the left end and the right end of the preceding vehicle even in normal steering control for following the preceding vehicle. This allows steering control for following the preceding vehicle to be suited to the feeling of the driver.

Preferably, an offset amount of the target traveling point in the input direction of the steering torque is within a range that prevents the subject vehicle from running out of the traffic lines when steering is controlled so that the subject vehicle passes over the traveling target point.

In this case, since the traveling target point is set within the range that prevents the subject vehicle from running out of the traffic lines, it is possible to give a feeling of security to the driver and to improve safety of steering control for following the preceding vehicle, and the above-described advantages of the invention can be achieved more reliably.

Preferably, an offset amount of the traveling target point in the input direction of the steering torque is set so that the absolute value of the offset amount is more than a normal value when another vehicle is detected in a traveling lane adjacent to the traveling lane of the subject vehicle across the traffic line in a direction opposite the input direction of the steering torque.

Since the offset amount of the traveling target point in the input direction of the steering torque is corrected so as to increase the absolute value of the offset amount when another vehicle exists in the adjacent traveling lane, the subject vehicle can be kept away from the traffic line. For this reason, it is possible to give a feeling of security to the driver and to improve safety of steering control for following the preceding vehicle, and the above-described advantages of the invention can be achieved more reliably.

Preferably, an offset amount of the traveling target point in the input direction of the steering torque is set so that the absolute value of the offset amount is more than a normal value when an object that enters a region between the subject vehicle and the preceding vehicle sideways from a direction opposite the input direction of the steering torque.

In this case, when an object that enters the region between the subject vehicle and the preceding vehicle is detected, the offset amount in the input direction of the steering torque is corrected so as to increase the absolute value thereof. This can reduce the possibility that the subject vehicle will collide with the object. For this reason, safety of steering control for following the preceding vehicle can be improved, and the above-described advantages of the invention can be achieved more reliably.

BRIEF DESCRIPTION OF THE DRAWINGS

FIG. 15A shows a case in which the preceding vehicle is traveling in a traveling lane end at the right traffic line, and FIG. 15B shows a case in which the preceding vehicle is traveling in a traveling lane end at the left traffic line;

FIG. 16A shows a case in which the preceding vehicle is traveling in the traveling lane end at the right traffic line, and FIG. 16B shows a case in which the preceding vehicle is traveling in the traveling lane end at the left traffic line;

DESCRIPTION OF THE PREFERRED EMBODIMENTS

A steering assist system according to an embodiment of the present invention will be described below with reference to the drawings.

While a preceding vehicle and traffic lines marked on the road are detected by analyzing stereo images taken by two cameras in the following description, the detection means is not limited to the cameras as long as it can detect the preceding vehicle and the traffic lines. For example, the preceding vehicle and so on can be detected by analyzing reflected waves of radio waves emitted from a radar apparatus, or can be detected by using a camera and a radar apparatus in combination.

Figure 1:
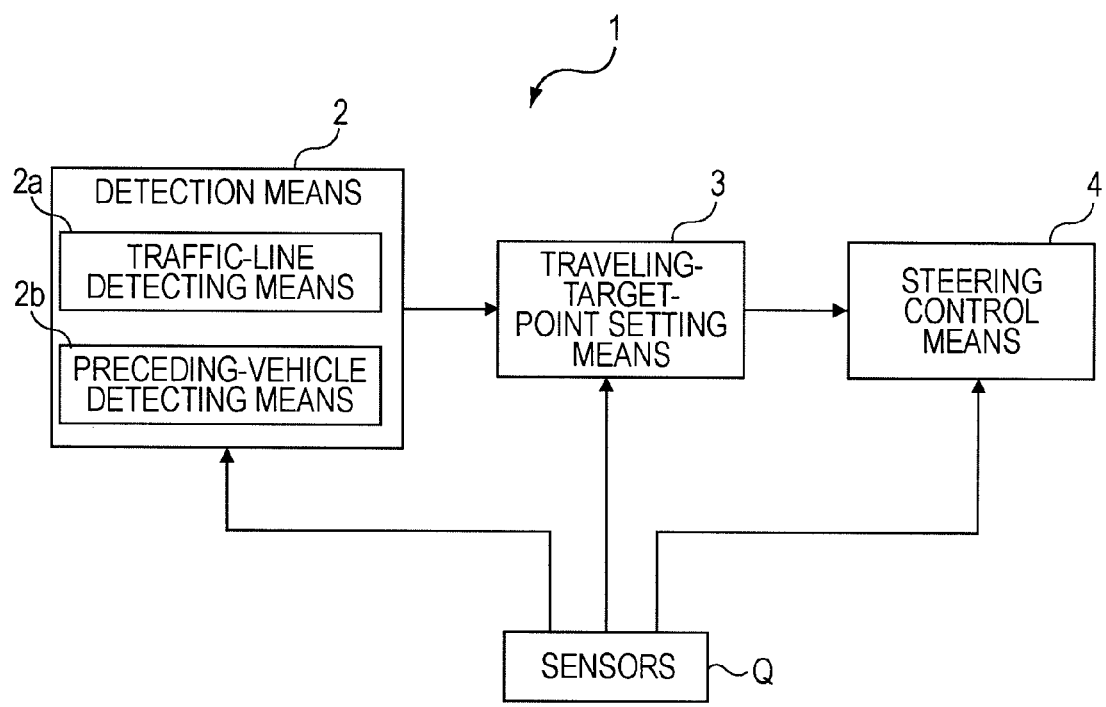
FIG. 1 is a block diagram showing a configuration of a steering assist system according to an embodiment.

Referring to FIG. 1, a steering assist system 1 according to the embodiment includes a detection means 2 having a traffic-line detecting means 2a and a preceding-vehicle detecting means 2b, a traveling-target-point setting means 3, and a steering control means 4.

Figure 2:
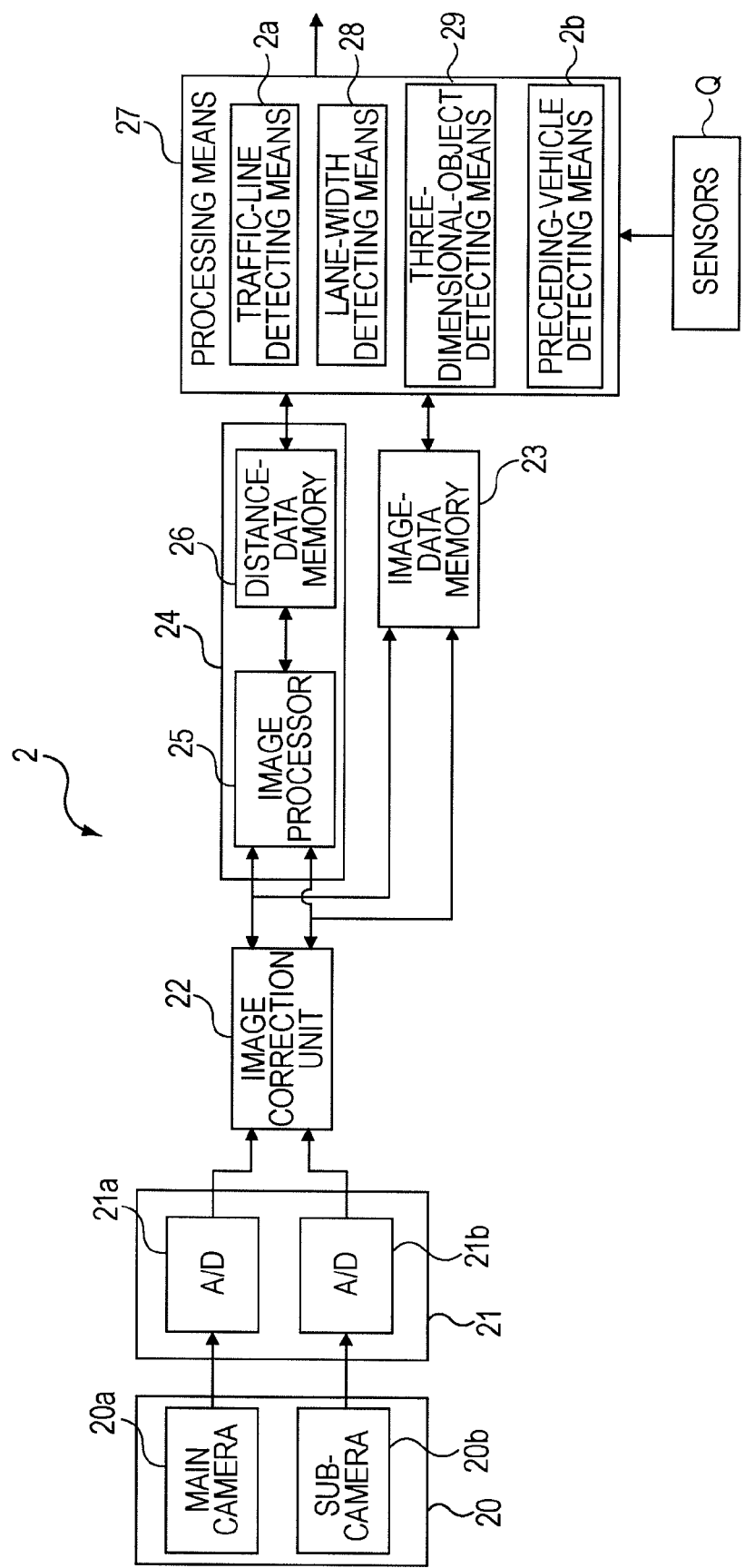
FIG. 2 is a block diagram showing a configuration of a detection means in the steering assist system shown in FIG. 1.

As shown in FIG. 2, the detection means 2 mainly includes an image taking means 20, a conversion means 21, an image processing means 24, and a processing means 27 including the traffic-line detecting means 2a and the preceding-vehicle detecting means 2b. The structures from the image taking means 20 to a distance-data memory 26 and the traffic-line detecting means 2a and a three-dimensional-object detecting means 29 of the processing means 27 in the detection means 2 are based on the systems disclosed in Japanese Unexamined Patent Application Publication Nos. 5-114099, 5-265547, 6-266828, 10-283461, 10-283477, and 2006-331389 filed earlier by the present applicant. The detection means 2 will be briefly described below.

In the detection means 2, a pair of images of the surroundings of a subject vehicle are taken by the image taking means 20 including a main camera 20a and a sub-camera 20b. The main camera 20a and the sub-camera 20b are spaced a fixed distance apart in the vehicle width direction, for example, on the inner side of the front glass of the subject vehicle. The taken images are converted into digital images by A/D converters 21a and 21b serving as the conversion means 21. The converted images are subjected to image correction, such as removal of displacement and noise and correction of the brightness, by an image correction unit 22, and are then stored in an image-data memory 23.

Figure 3:
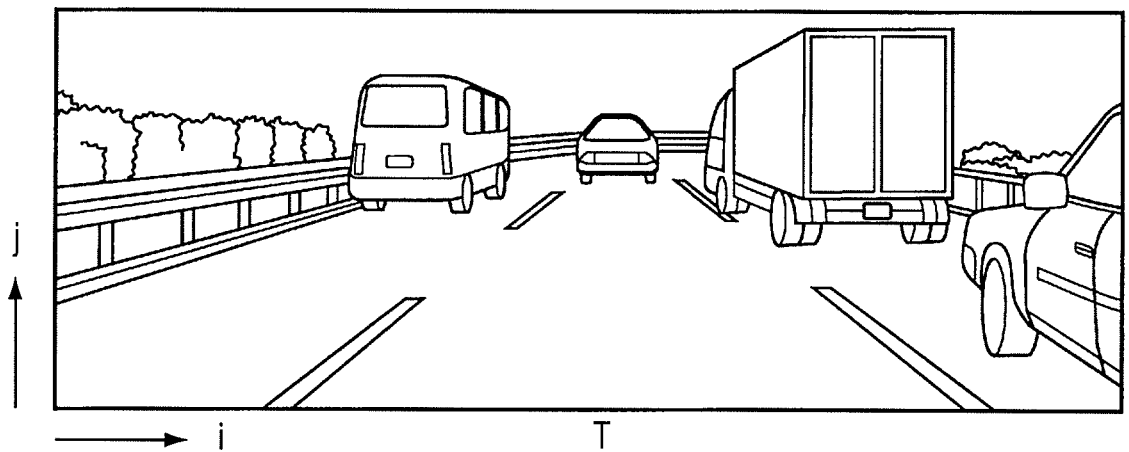
FIG. 3 shows an example of a reference image.

The pair of images are also transmitted from the image correction unit 22 to the image processing means 24. By an image processor 25 in the image processing means 24, a reference image T taken by the main camera 20a, as shown in FIG. 3, is divided into a plurality of pixel blocks (not shown). Correspondingly to the pixel blocks, pixel blocks of an image (not shown) taken by the sub-camera 20b are found by stereo matching, and a parallax is calculated for each pixel block.

The parallax can be uniquely correlated with the position in real space according to the principle of triangulation using the following expressions. More specifically, a point (X, Y, Z) in real space, a parallax dp, and coordinates (i, j) of a pixel block in the reference image T have a relationship expressed by the following expressions:

$$X = CD/2 + Z \times PW \times (i - IV) \quad (1)$$

$$Y = CH + Z \times PW \times (j - JV) \quad (2)$$

$$Z = CD/(PW \times (dp - DP)) \quad (3)$$

where a point on a road surface just below the midpoint between the main camera 20a and the sub-camera 20b is designated as the origin, the X-axis indicates the width direction of the subject vehicle, the Y-axis indicates the vehicle height direction, and the Z-axis indicates the vehicle length direction, that is, the distance direction.

Here, CD represents the distance between the main camera 20a and the sub-camera 20b, PW represents the viewing angle for one pixel, CH represents the mounting height of the main camera 20a and the sub-camera 20b, IV and JV respectively represent i and j coordinates of the point at infinity in front of the subject vehicle, and DP represents the vanishing point parallax.

Figure 4:
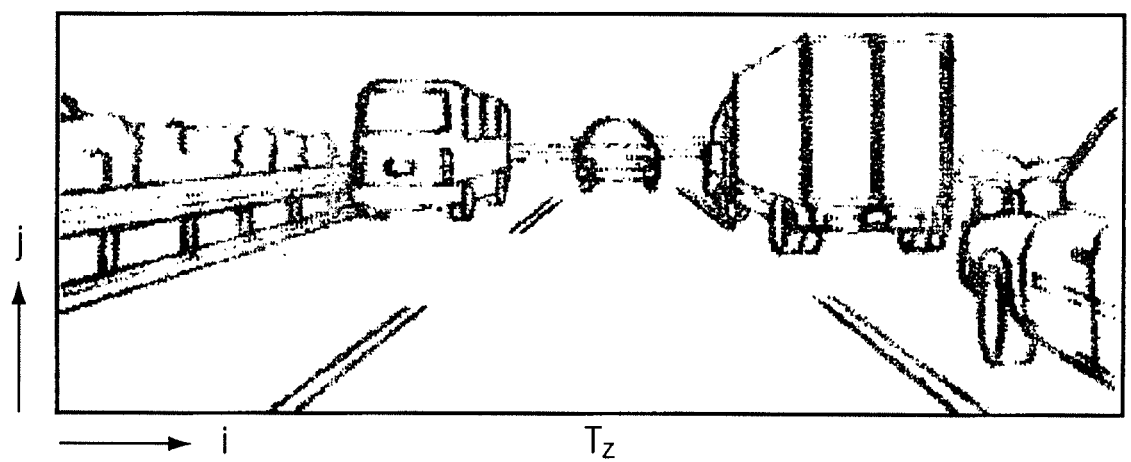
FIG. 4 shows a distance image formed on the basis of the reference image shown in FIG. 2.

The image processor 25 in the image processing means 24 assigns parallaxes dp to the pixel blocks in the reference image T, stores the parallaxes dp in a distance-data memory 26. Hereinafter, an image formed by assigning the parallaxes dp to the pixel blocks in the reference image T, as shown in FIG. 4, will be referred to as a distance image Tz.

Alternatively, for example, the distance Z from the subject vehicle can be measured with a radar apparatus that measures the distance Z by analyzing reflected waves of laser light or infrared light applied to the front of the subject vehicle. The method for collecting information about the distance Z from the subject vehicle is not limited to a specific method.

The processing means 27 is formed by a computer in which a CPU, a ROM, a RAM, an input/output interface, etc., which are not shown, are connected to a bus. Further, sensors Q, such as a vehicle-speed sensor, a yaw-rate sensor, and a steering-angle sensor for measuring the steering angle of the steering wheel, are connected to the processing means 27, as shown in FIG. 2, and necessary data, such as the vehicle speed, the yaw rate, the steering angle and the steering torque of the steering wheel, are transmitted to the processing means 27. The yaw-rate sensor can be replaced with a device that estimates the yaw rate, for example, from detected values including the vehicle speed of the subject vehicle. The sensors Q are connected not only to the processing means 27 in the detection means 2, but also to the traveling-target-point setting means 3 and the steering control means 4 so as to transmit necessary information thereto, as shown in FIG. 1.

The processing means 27 includes the traffic-line detecting means 2a, a lane-width detecting means 28, the three-dimensional-object detecting means 29, the preceding-vehicle detecting means 2b, and a memory (not shown).

Figure 5:
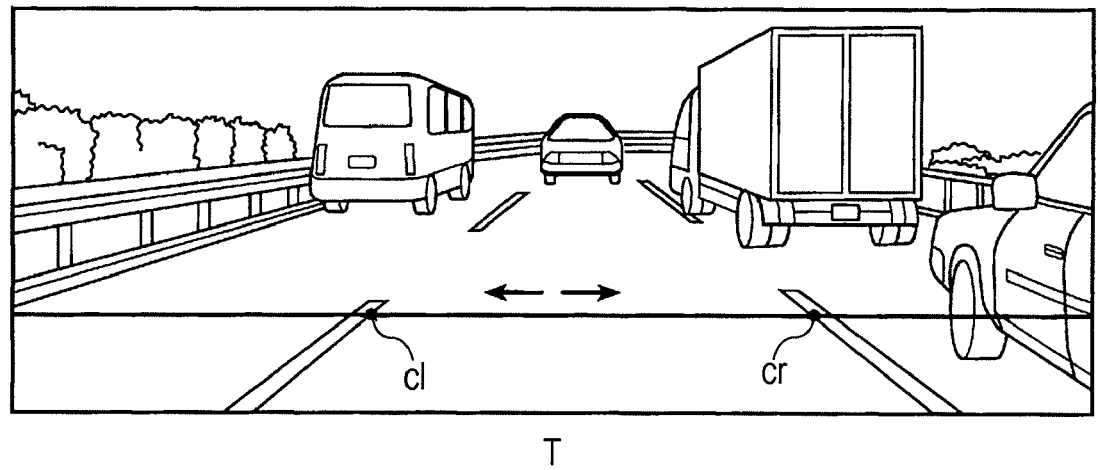
FIG. 5 shows right and left traffic-line candidate points detected in the reference image shown in FIG. 2.

The traffic-line detecting means 2a detects traffic lines marked on the road. More specifically, the traffic-line detecting means 2a sequentially calculates the amounts of change in brightness between the adjacent pixels on a horizontal line j having a width corresponding to one pixel in the reference image T illustrated in FIG. 3 from the center of the reference image T to the right and left sides, and detects, as traffic-line candidate points cr and cl, pixels where the brightness greatly changes by an amount more than or equal to a set threshold value, as shown in FIG. 5. The traffic-line detecting means 2a continues this operation while shifting the horizontal line j upward one by one in the reference image T, and thereby detects traffic-line candidate points cr and cl for each horizontal line j.

Figure 6:
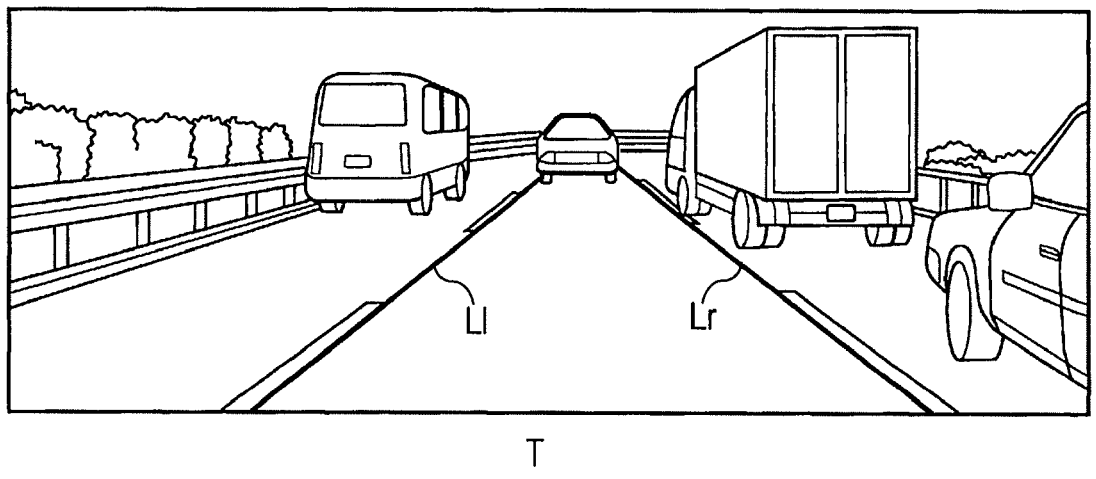
FIG. 6 shows right and left traffic lines detected in the reference image shown in FIG. 2.

In this case, the traffic-line detecting means 2a removes, from the detected traffic-line candidate points, traffic-line candidate points cr and cl that are judged as not being on the road surface on the basis of the distance image, and further removes, from the detected traffic-line candidate points cr and cl, traffic-line candidate points cr and cl that are not consistent with other traffic-line candidate points cr and cl. Then, the traffic-line detecting means 2a connects the traffic-line candidate points cr on the right side of the subject vehicle and the traffic-line candidate points cl on the left side of the subject vehicle, and thereby detects traffic lines Lr and Ll respectively on the right and left sides of the subject vehicle, as shown in FIG. 6.

The traffic-line detecting means 2a stores information about the detected traffic lines Lr and Ll in the memory. Hereinafter, the traffic lines Lr and Ll on the right and left sides of the subject vehicle will be respectively referred to as a right traffic line Lr and a left traffic line Ll. The above-described method for detecting the traffic lines has been described in detail in Japanese Unexamined Patent Application Publication No. 2006-331389.

The lane-width detecting means 28 calculates the distance (hereinafter referred to as a lane width) in real space between the right traffic line Lr and the left traffic line Ll on the basis of information about the right and left traffic lines Lr and Ll detected by the traffic-line detecting means 2a, and stores the lane width in the memory.

More specifically, although not shown, the lane-width detecting means 28 converts the right traffic line Lr and the left traffic line Ll, which have been detected on the right and left sides of the subject vehicle by the traffic-line detecting means 2a, into right and left traffic lines Lr and Ll in real space, respectively, and calculates the distance between the right and left traffic lines Lr and Ll a predetermined distance ahead of the subject vehicle. Then, the lane-width detecting means 28 stores the calculated distance as a lane width in the memory. Alternatively, the right and left traffic lines Lr and Ll in real space may be extended to the subject vehicle, and the distance between the traffic lines Lr and Ll at the subject vehicle may be set as the lane width.

The three-dimensional-object detecting means 29 detects three-dimensional objects from the reference image T on the basis of the above-described distance image Tz. In this embodiment, the three-dimensional-object detecting means 29 is based on the apparatuses disclosed in the above-described publications. The operation of the three-dimensional-object detecting means 29 will be briefly described below.

The three-dimensional-object detecting means 29 divides the distance image Tz shown in FIG. 4 into vertical strip sections each having a predetermined width, forms a histogram relating to parallaxes dp provided above the road surface, of parallaxes included in each section, and sets the mode of the histogram as a parallax dp of the section. This operation is performed for all sections. Then, the three-dimensional-object detecting means 29 calculates the coordinates (X, Z) in real space on the basis of the i-coordinates and the extracted parallaxes dp of the sections according to the above Expressions (1) to (3).

Figure 7:
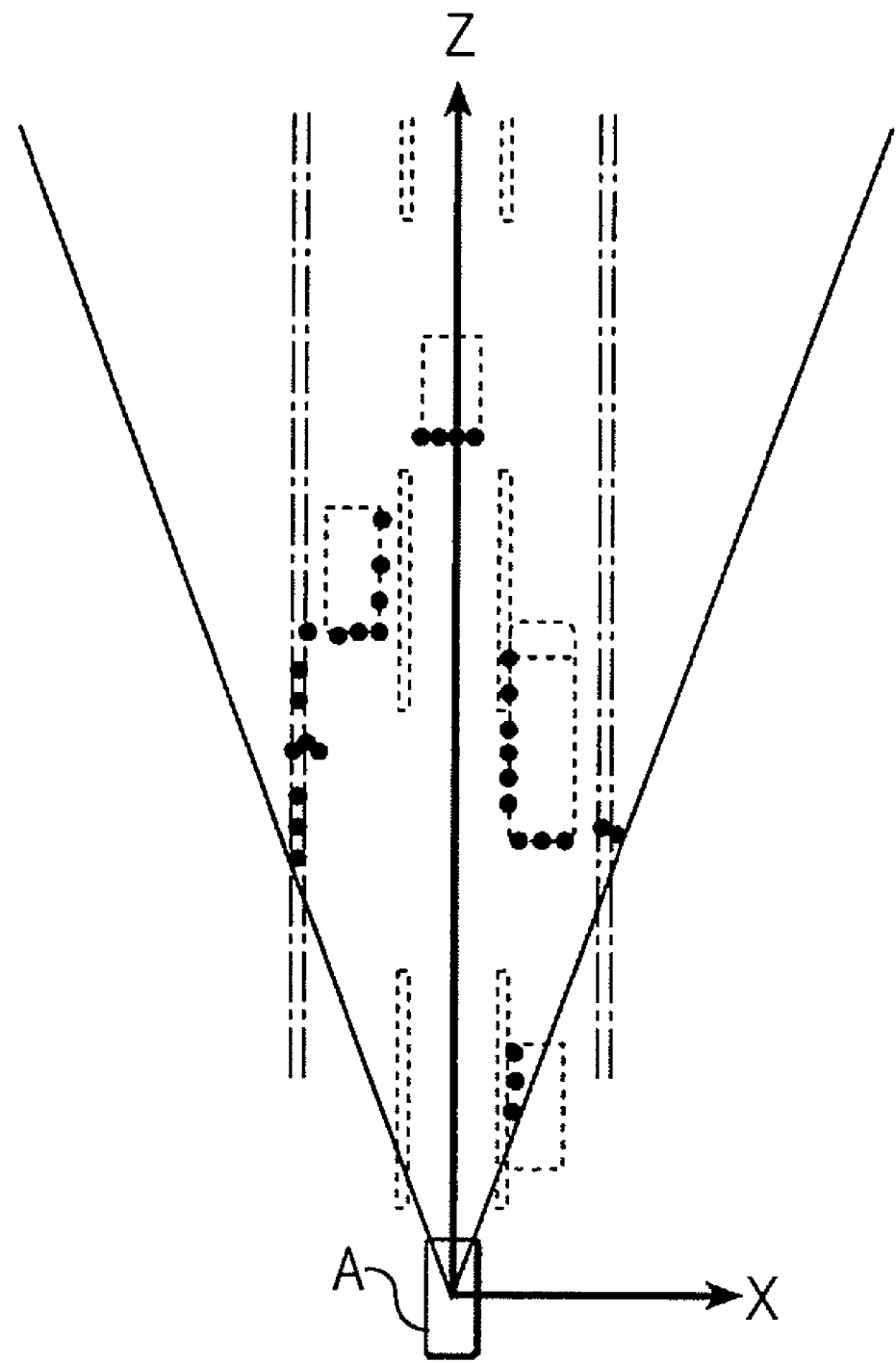
FIG. 7 shows dots obtained by plotting parallaxes of sections in real space.

When the coordinates (X, Z) thus calculated are plotted in real space, they are plotted as dots with some variations in portions of forward three-dimensional objects facing a subject vehicle A, as shown in FIG. 7.

Figure 8:
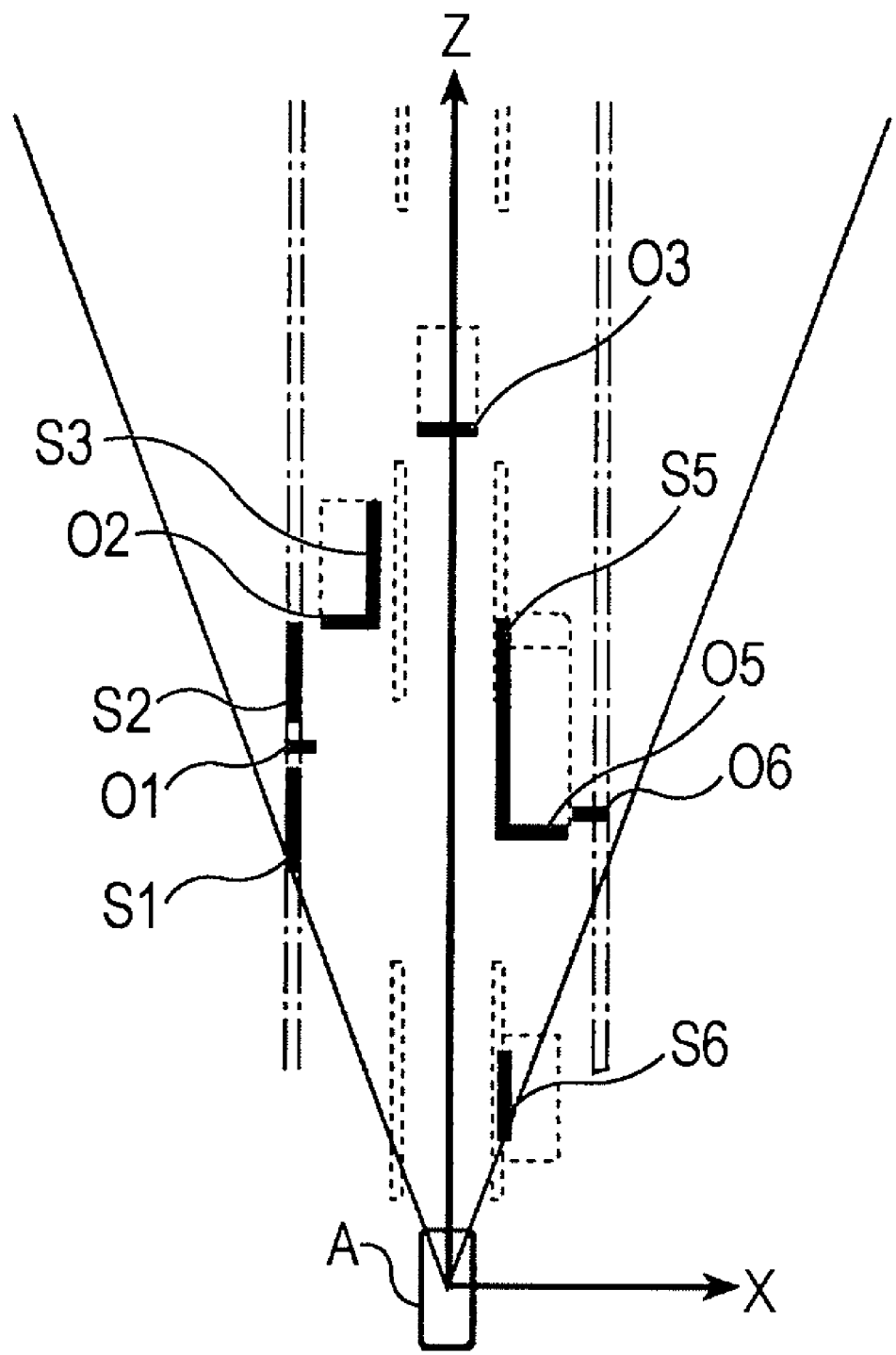
FIG. 8 shows objects obtained by linear approximation of the dots shown in FIG. 7.

The three-dimensional-object detecting means 29 searches for the distances from the plotted dots to the adjacent dots in the X- and Z-axis directions in real space, classifies dots having values within set threshold ranges into groups, and subjects the dots in the groups to linear approximation so as to detect three-dimensional objects, as shown in FIG. 8. Further, the three-dimensional-object detecting means 29 encloses the detected three-dimensional objects by rectangular frames in the reference image T, as shown in FIG. 9.

Figure 9:
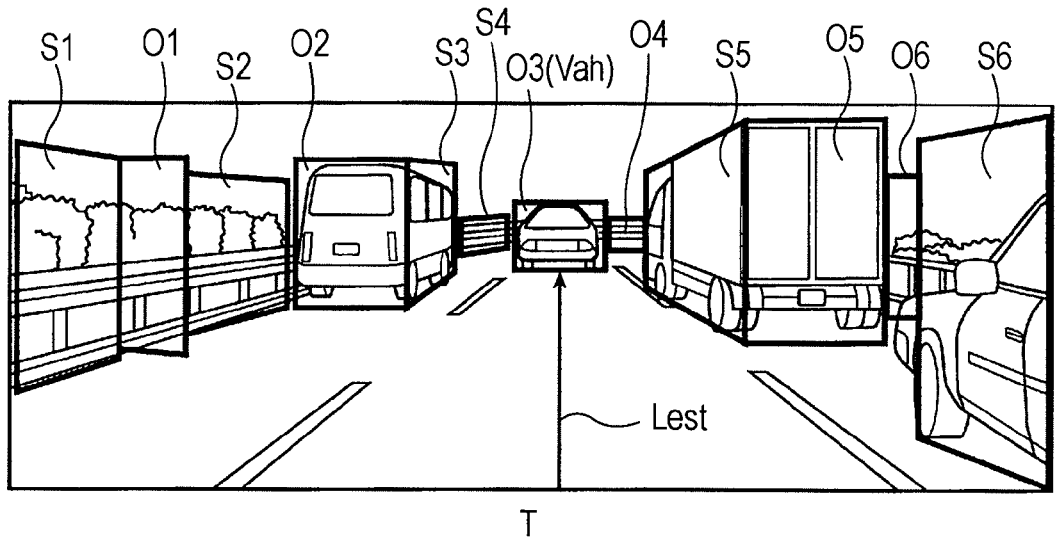
FIG. 9 shows three-dimensional objects detected and enclosed by frames in the reference image.

In FIGS. 8 and 9, labels O and S represent the types of faces of the three-dimensional objects facing the subject vehicle A. Label O shows that a rear face of a three-dimensional object is detected, and label S shows that a side face of the three-dimensional object is detected. A three-dimensional object labeled with O2 and a three-dimensional object labeled with S3 in FIGS. 8 and 9 are detected as one three-dimensional object because of the positional relationship. This also applies to a three-dimensional object labeled with S5 and a three-dimensional object labeled with O5.

The three-dimensional-object detecting means 29 stores information about the detected three-dimensional objects in the memory.

The preceding-vehicle detecting means 2b detects a preceding vehicle traveling ahead of the subject vehicle, from the three-dimensional objects detected by the three-dimensional-object detecting means 29.

Figure 10:
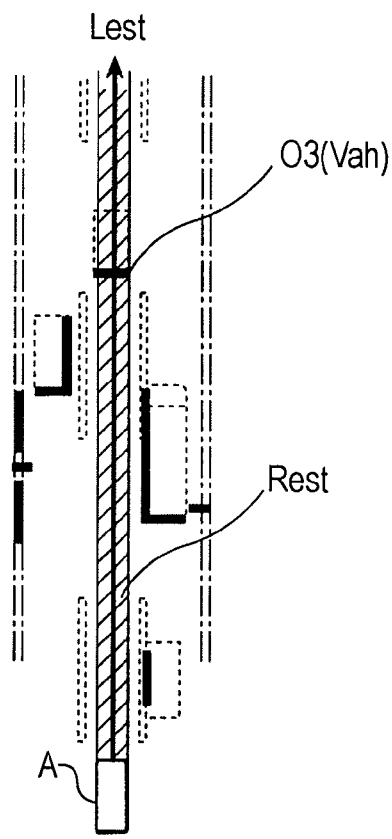
FIG. 10 illustrates a traveling locus and a traveling path of a subject vehicle.

In this embodiment, the preceding-vehicle detecting means 2b first estimates, as a traveling locus Lest, a locus that the subject vehicle A will form, on the basis of the behavior of the subject vehicle A, as shown in FIG. 10. Then, the preceding-vehicle detecting means 2b calculates, as a traveling lane Rest of the subject vehicle A, a region that has a width equal to the width of the subject vehicle A and that includes the traveling locus Lest at the center thereof. The traveling locus Lest of the subject vehicle A can be calculated from the turning curvature Cua of the subject vehicle A. The turning curvature Cua is calculated according to the following Expression (4) or the following Expressions (5) and (6) on the basis of the vehicle speed V of the subject vehicle A, the yaw rate γ, the steering angle δ of the steering wheel, etc:

$$Cua = \gamma/V \quad (4)$$

$$Re = (1 + Asf \cdot V^2) \cdot (Lwb/\delta) \quad (5)$$

$$Cua = 1/Re \quad (6)$$

where Re represents the turning radius, Asf represents the stability factor of the vehicle, and Lwb represents the wheel base.

The preceding-vehicle detecting means 2b detects, as a preceding vehicle, a vehicle closest to the subject vehicle A, from the vehicles existing on the traveling lane Rest of the subject vehicle A. For example, a vehicle O3 is detected as a preceding vehicle Vah in FIGS. 9 and 10.

In this embodiment, the preceding-vehicle detecting means 2b detects, as coordinates (Xg, Zg) of the center of gravity G of the preceding vehicle Vah (see FIG. 13), a point where the X-coordinate of the midpoint between the right and left ends of a frame corresponding to the detected preceding vehicle Vah is designated as an X-coordinate Xg and the Z-coordinate a predetermined distance (e.g., 2 m) ahead of the midpoint is designated as a Z-coordinate Zg, of the frames enclosing the three-dimensional objects detected in the reference image T by the three-dimensional-object detecting means 29 (see FIG. 9).

The preceding-vehicle detecting means 2b stores information about the detected preceding vehicle Vah, including the coordinates (Xg, Zg), in the memory.

The detection means 2 outputs information about the right traffic line Lr, the left traffic line Ll, the lane width, the three-dimensional objects, the preceding vehicle Vah detected, as described above, to the traveling-target-point setting means 3.

Figure 11:
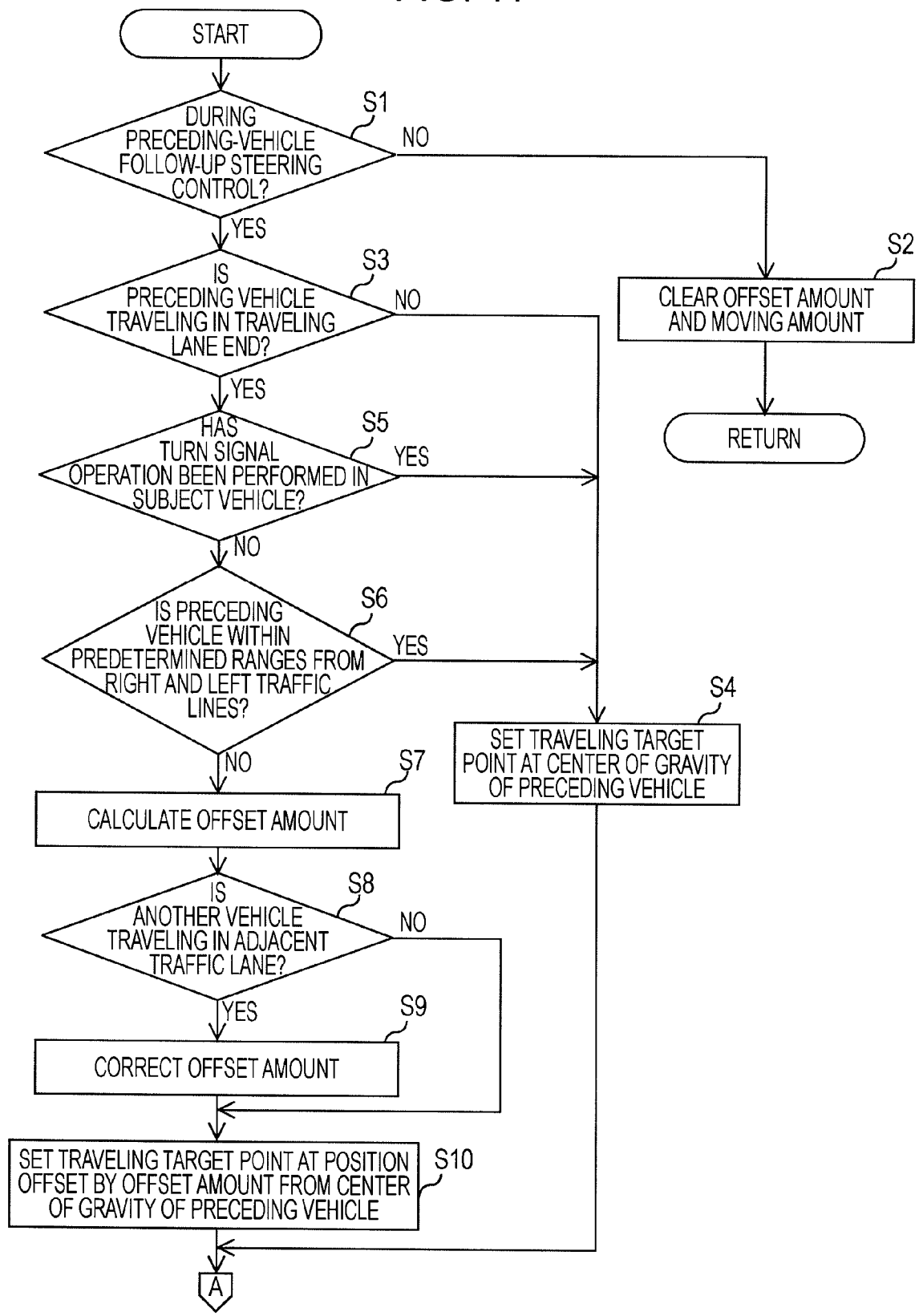
FIG. 11 is a flowchart showing a procedure performed by a traveling-target-point setting means and a steering control means.
Figure 12:
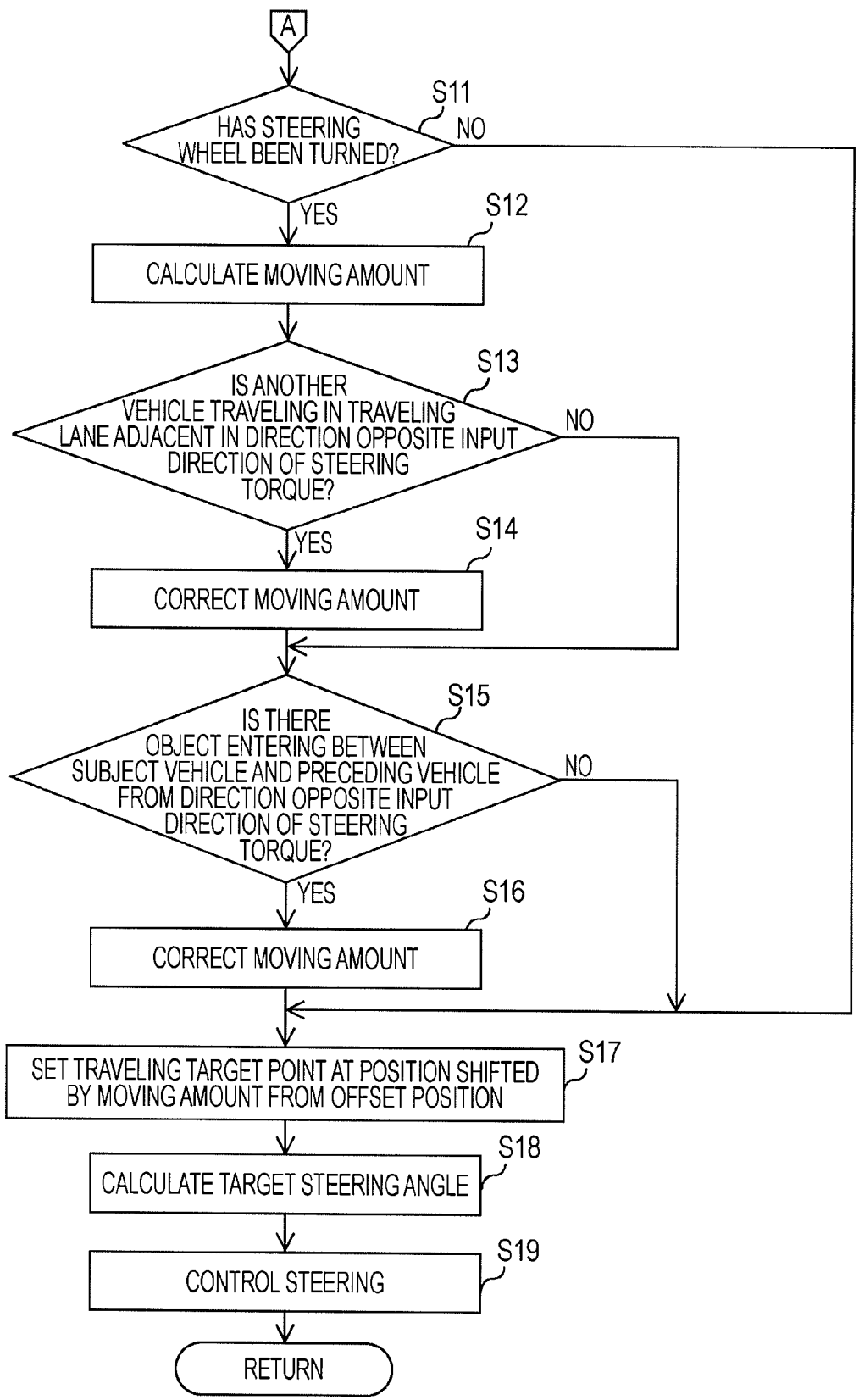
FIG. 12 is a flowchart showing the procedure performed by the traveling-target-point setting means and the steering control means.

The-traveling-target-point setting means 3 and the steering control means 4 perform operations according to flowcharts shown in FIGS. 11 and 12. The control configurations of the means will be described below with reference to the flowcharts shown in FIGS. 11 and 12. Operation of the steering assist system 1 according to the embodiment will also be described.

When the position of the preceding vehicle Vah detected by the preceding-vehicle detecting means 2b is out of predetermined ranges from the right traffic line Lr and the left traffic line Ll, the traveling-target-point setting means 3 sets a traveling target point of the subject vehicle at a predetermined position in the preceding vehicle Vah. When the position of the preceding vehicle Vah is within a predetermined range from any one of the right traffic line Lr and the left traffic line Ll, the traveling-target-point setting means 3 sets a traveling target point at a position offset from the predetermined position in the preceding vehicle Vah toward the center of the traveling lane of the subject vehicle. This setting will be described in detail below.

First, the traveling-target-point setting means 3 determines whether or not steering control for following the preceding vehicle is being performed in the subject vehicle (Step S1 in FIG. 11). When the control is not being performed (Step S1; NO), the traveling-target-point setting means 3 clears the offset amount and the moving amount which will be described below (Step S2), and finishes the procedure. In contrast, when steering control for following the preceding vehicle is being performed (Step S1; YES), the traveling-target-point setting means 3 determines whether or not the preceding vehicle Vah is traveling at a traveling lane end (Step S3).

Here, the term "traveling lane end" refers to a predetermined range from the right traffic line Lr or the left traffic line Ll. When the position of the center of gravity G of the preceding vehicle Vah is within this range, it is said that the preceding vehicle is traveling in the traveling lane end. In this embodiment, as shown in FIG. 13, a traveling lane end, that is, a predetermined range from the traffic line refers to a range extending from a position a predetermined first distance D1 apart from the right traffic line Lr or the left traffic line Ll in a direction toward the center Cl of a traveling lane R (in the negative X-axis direction for the right traffic line Lr, and in the positive X-axis direction for the left traffic line Ll) to a position a second predetermined distance D2 apart from the traffic line in a direction opposite the center CL of the traveling lane R (in the positive X-axis direction for the right traffic line Lr, and in the negative X-axis direction for the left traffic line Ll).

While the position of the preceding vehicle Vah is specified on the basis of the position of the center of gravity G of the preceding vehicle Vah in this embodiment, as described above, it can be specified on the basis of positions other than the center of gravity G. In this embodiment, the first distance D1 and the second distance D2 shown in FIG. 13 are both set at 1300 mm.

Figure 13:
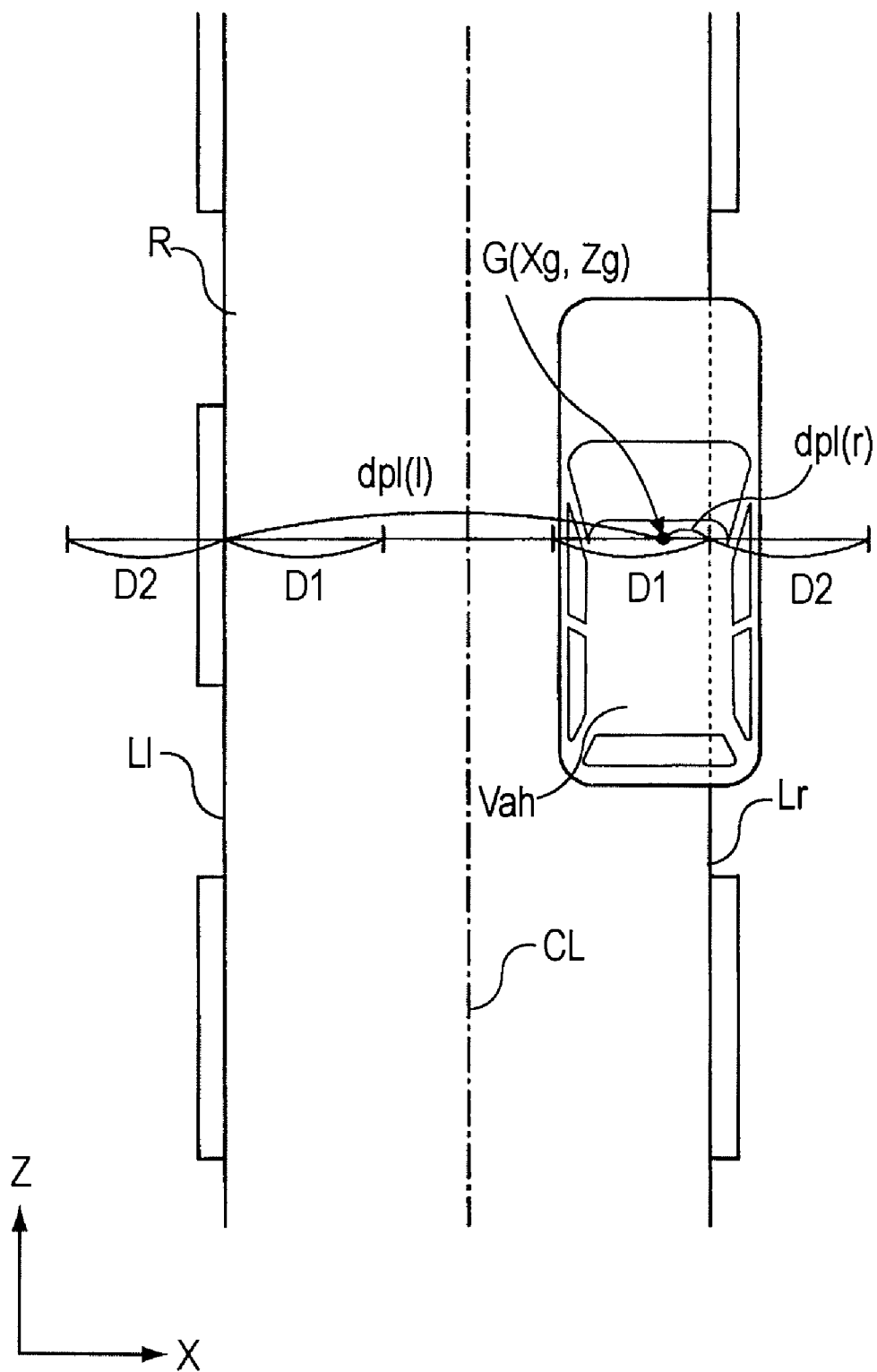
FIG. 13 explains a first distance, a second distance, and positions dpl(r) dpl(l) of the center of gravity with respect to right and left traffic lines.

Further, the positions of the center of gravity G of the preceding vehicle Vah in the X-axis direction relative to the right traffic line Lr and the left traffic line Ll, that is, the X-coordinates of the center of gravity G of the preceding vehicle Vah relative to the right traffic line Lr and the left traffic line Ll are designated as dpl(r) (mm) and dpl(l) (mm), respectively, as shown in FIG. 13.

When the position of the center of gravity G of the preceding vehicle Vah is on the positive side, that is, on the right side of the right traffic line Lr or the left traffic line Ll in the X-axis direction, dpl(r) or dpl(l) has a positive value. In contrast, when the position of the center of gravity G of the preceding vehicle Vah is on the negative side, that is, on the left side of the right traffic line Lr or the left traffic line Ll in the X-axis direction, dpl(r) or dpl(l) has a negative value. Therefore, in FIG. 13, dpl(r) has a positive value, and dpl(l) has a negative value.

Since both the first distance D1 and the second distance D2 are set at 1300 mm in this embodiment, as described above, when dpl(r) and dpl(l) are within the following ranges, it is determined that the preceding vehicle Vah is traveling at a traveling lane end for the right traffic line Lr or the left traffic line Ll:

$$-1300 \leq dpl(r) \leq 1300 \quad (7)$$

$$-1300 \leq dpl(l) \leq 1300 \quad (8)$$

The traveling-target-point setting means 3 makes determination according to the above-described criterion. When the traveling-target-point setting means 3 determines that the preceding vehicle Vah is not traveling at any of the traveling lane ends for the right traffic line Lr and the left traffic line Ll, that is, that dpl(r) and dpl(l) are out of the ranges defined in Expressions (7) and (8) described above (Step S3 in FIG. 11; NO), it sets a traveling target point at a predetermined position in the preceding vehicle Vah, because normal steering control for following the preceding vehicle should be performed in this case (Step S4).

Figure 14:
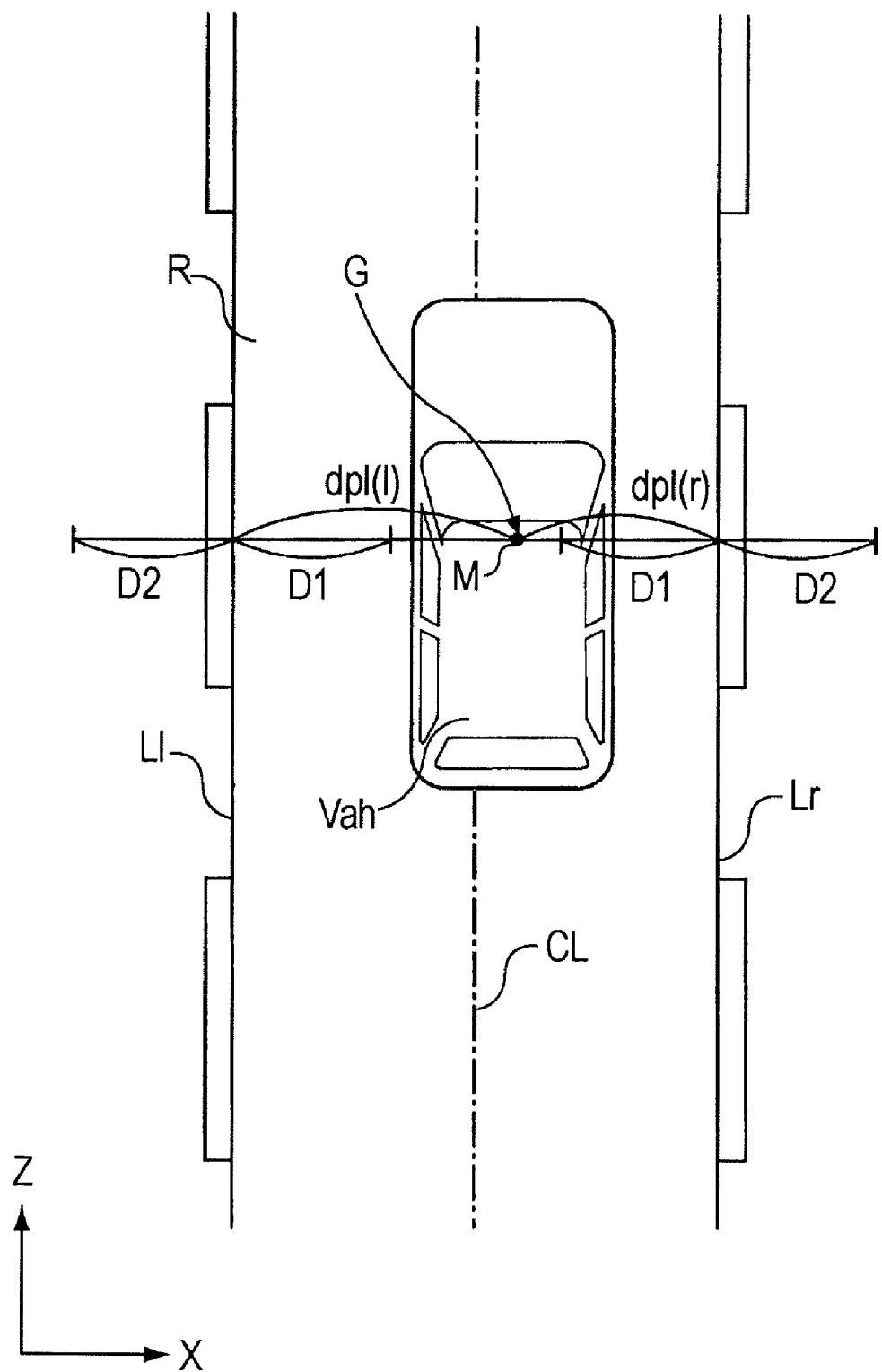
FIG. 14 illustrates how to set a traveling target point when a preceding vehicle is not traveling in a traveling lane end.

In this case, as shown in FIG. 14, the predetermined position in the preceding vehicle Vah where a traveling target point M should be set is at the center of gravity G of the preceding vehicle Vah, and the traveling target point M is set at the center of gravity G of the preceding vehicle Vah.

Even when the traveling-target-point setting means 3 determines, according to the above-described criterion, that the preceding vehicle Vah is traveling in the traveling lane end (Step S3 in FIG. 11; YES), it sets a traveling target point at the predetermined position in the preceding vehicle Vah, that is, at the center of gravity G when a turn signal operation is performed by the driver so as to turn the subject vehicle toward the traffic line to which the preceding vehicle Vah is close (Step S5; YES), because the subject vehicle should follow the preceding vehicle Vah (Step S4).

However, when the preceding vehicle Vah is traveling in the traveling lane end (Step S3; YES) and a turn signal operation is not performed toward the traffic line to which the preceding vehicle Vah is close (Step S5; NO), there is a probability that normal steering control for following the preceding vehicle should not be performed.

For this reason, the traveling-target-point setting means 3 subsequently determines whether or not both dpl(r) and dpl(l) are respectively within the ranges given by Expressions (7) and (8) described above, and thereby determines whether or not the preceding vehicle Vah is within both the predetermined ranges from the right and left traffic lines Lr and Ll (Step S6). For example, when the center of gravity G of the preceding vehicle Vah is within a predetermined range from the right traffic line Lr and is also within a predetermined range from the left traffic line Ll, that means that the lane width of the traveling lane R is small, but does not mean that the preceding vehicle Vah is traveling only in the traveling lane end at the right traffic line Lr.

Therefore, when the preceding vehicle Vah is within both the predetermined ranges from the right and left traffic lines Lr and Ll (Step S6; YES), the traveling-target-point setting means 3 continues normal steering control for following the preceding vehicle and sets a traveling target point M at the center of gravity G of the preceding vehicle Vah (Step S4).

In Step S6 described above, for example, it can be determined whether or not the distance in real space between the right traffic line Lr and the left traffic line Ll detected by the lane-width detecting means 28, that is, the lane width of the traveling lane R is less than or equal to a preset threshold value. In this case, when the lane width is less than or equal to the threshold value, a traveling target point M is set at the center of gravity G of the preceding vehicle Vah, similar to normal steering control for following the preceding vehicle.

In contrast, when the preceding vehicle Vah is traveling in the traveling lane end at the right traffic line Lr or the left traffic line Ll (Step S3; YES), a turn signal operation is not performed toward the traffic line to which the preceding vehicle Vah is close (Step S5; NO), and the preceding vehicle Vah is not simultaneously within both the predetermined ranges from the right and left traffic lines Lr and Ll (Step S6;

NO), it is determined that the preceding vehicle Vah is traveling in the traveling lane end at the right traffic line Lr or the left traffic line Ll. Therefore, the traveling-target-point setting means 3 performs control that is characteristic of the present invention.

Figure 15A:
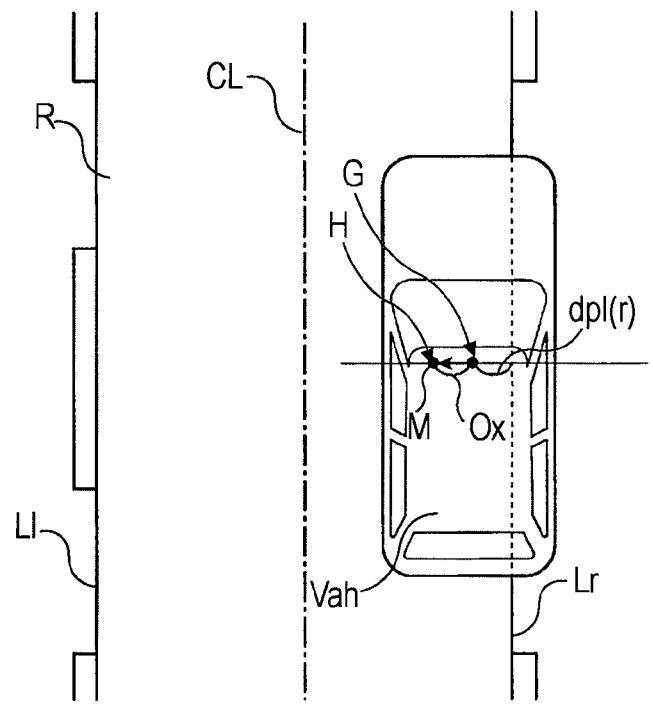
FIGS. 15A and 15B illustrate how to set a traveling target point when the preceding vehicle is traveling in the traveling lane end.
Figure 15B:
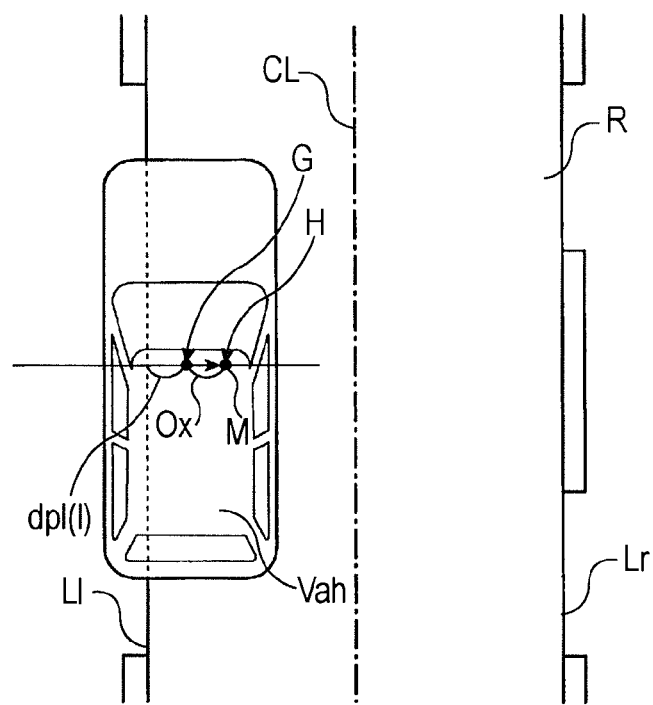

In this case in which the preceding vehicle Vah is traveling in the traveling lane end at the right traffic line Lr or the left traffic line Ll, the traveling-target-point setting means 3 sets a traveling target point M at a position H offset in the X-axis direction from the center of gravity G of the preceding vehicle Vah, where the traveling target point is set when the preceding vehicle Vah is not within the predetermined ranges from the traffic lines, toward the center CL of the traveling lane R of the subject vehicle, as shown in FIGS. 15A and 15B. FIG. 15A shows a case in which the preceding vehicle Vah is traveling in the traveling lane end at the right traffic line Lr, and FIG. 15B shows a case in which the preceding vehicle Vah is traveling in the traveling lane end at the left traffic line Ll.

In this embodiment, the traveling-target-point setting means 3 calculates an offset amount Ox (mm) of the traveling target point M, that is, a shift amount Ox from the center of gravity G to the positions H shown in FIGS. 15A and 15B, in the following manner (Step S7).

In other words, the offset amount Ox of the traveling target point M is calculated according to the following Expression (9) when the preceding vehicle Vah is traveling in the traveling lane end at the right traffic line Lr:

$$O_x = -\frac{1100}{1300} \cdot d_{pl}(r) - 1100 \quad (9)$$

The offset amount Ox of the traveling target point M is calculated according to the following Expression (10) when the preceding vehicle Vah is traveling in the traveling lane end at the left traffic line Ll:

$$O_x = -\frac{1100}{1300} \cdot d_{pl}(l) + 1100 \quad (10)$$

However, the values of dpl(r) and dpl(l) are limited by Expressions (7) and (8) described above.

Figure 16A:
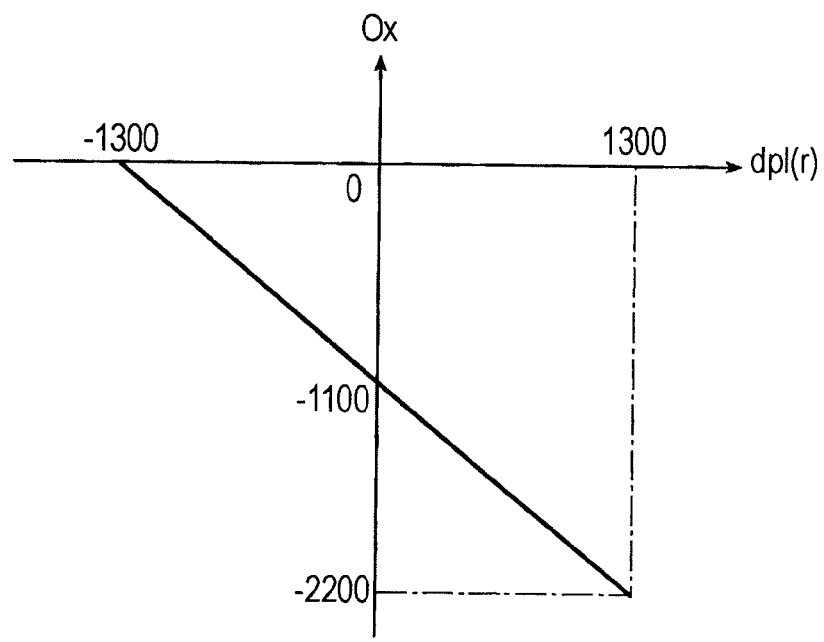
FIGS. 16A and 16B are graphs showing the relationships between dpl(r) and dpl(l) and the offset amount.
Figure 16B:
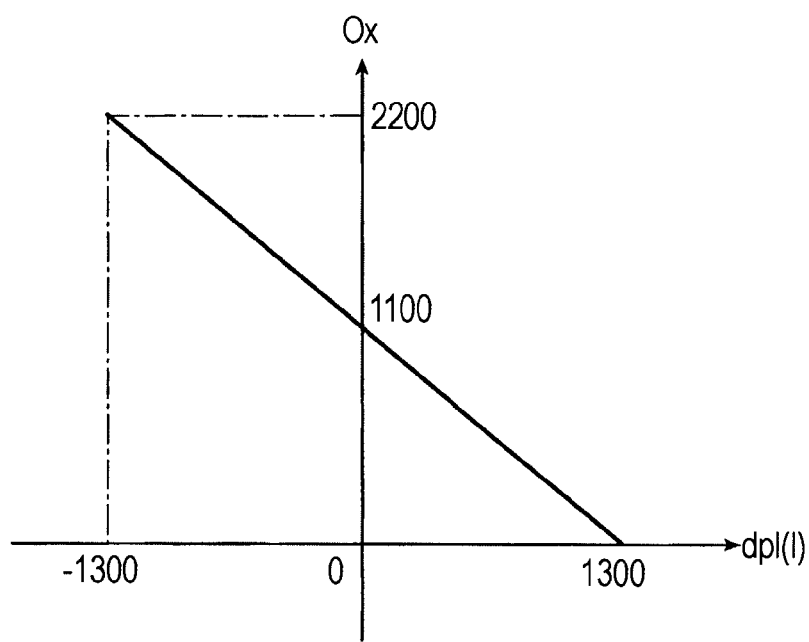
Figure 17:
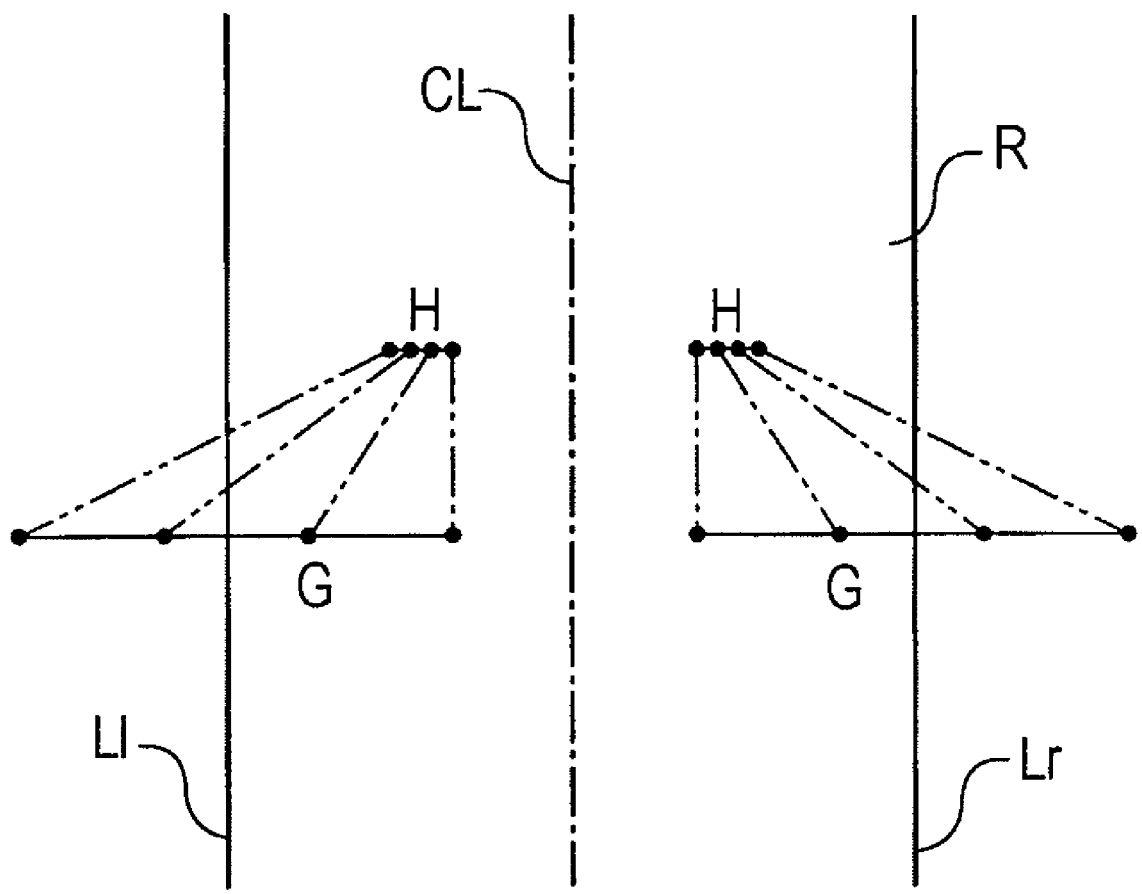
FIG. 17 illustrates the relationship between the position of the preceding vehicle and a position where a traveling target point is set when the preceding vehicle is traveling in the traveling lane end.

FIGS. 16A and 16B are graphs explaining the above Expressions (9) and (10). FIG. 17 shows how the position H, where the traveling target point M is set, changes as the center of gravity G of the preceding vehicle Vah changes with respect to the right traffic line Lr and the left traffic line Ll, according to Expressions (9) and (10) and the graphs shown in FIGS. 16A and 16B. While the position H is shown above the center of gravity G in FIG. 17, this does not mean that the position H is set at a position shifted from the center of gravity G in the Z-axis direction.

Referring to Expressions (9) and (10) and FIGS. 16A and 16B, the processing performed when the preceding vehicle Vah is traveling in the traveling lane end at the right traffic line Lr seems to be different from the processing performed when the preceding vehicle Vah is traveling in the traveling lane end at the let traffic line Ll. However, in Step S7, the offset amount Ox of the traveling target point M is set so that the absolute value thereof increases as the position of the preceding vehicle Vah moves farther away from the center CL of the traveling lane R of the subject vehicle, as shown in FIG. 17. Thus, the contents of processing for the right and left traffic lines are not different.

In other words, as the center of gravity G of the preceding vehicle Vah moves farther away from the center CL of the traveling lane R, that is, as the value dpl(r) (see FIGS. 13 to 16) increases on the side of the right traffic line Lr and the value dpl(l) (see FIGS. 13 to 16) decreases on the side of the left traffic line Ll, the absolute value of the offset amount Ox of the traveling target point M increases. The position H, where the traveling target point M is set, moves farther away from the center CL of the traveling lane R as the center of gravity G of the preceding vehicle Vah moves farther away from the center CL of the traveling lane R. However, the change amount in the position H is less than the change amount in the center of gravity G of the preceding vehicle Vah.

In this embodiment, when the preceding vehicle Vah is traveling in the traveling lane end, the setting position of the traveling target point M is thus offset from the center of gravity G of the preceding vehicle Vah to the position H closer to the center CL of the traveling lane R.

For this reason, the subject vehicle does not follow the preceding vehicle Vah while the traveling target point M remains at the center of gravity G of the preceding vehicle Vah, and the traveling direction of the subject vehicle is not rapidly changed toward the center CL of the traveling lane R where the traveling target point M is set. The setting position of the traveling target point M is shifted so that the traveling direction is set toward the position that is slightly closer to the center CL of the traveling lane R with respect to the preceding vehicle Vah and that prevents the subject vehicle from traveling over the traffic line.

In this embodiment, as shown by Expressions (9) and (10) described above, the absolute value of the offset amount Ox of the traveling target point M is set to increase in a linear function manner as the preceding vehicle Vah moves farther away from the center CL of the traveling lane R. This setting is based on the findings that the present inventors obtained by experiment.

It is not excluded that the absolute value of the offset amount Ox of the traveling target point M is set to increase in a quadratic function manner or manners of other functions as the preceding vehicle Vah moves farther away from the center CL of the traveling lane R. However, it has been confirmed that, when the absolute value is set to increase in a linear function manner, control can be performed so that the subject vehicle most naturally follows the preceding vehicle without coming out from the traffic lines and without giving any feeling of insecurity and discomfort to the driver.

Subsequently, the traveling-target-point setting means 3 determines whether or not another vehicle exists in a traveling lane adjacent to the traveling lane R of the subject vehicle beyond the traffic line in the traveling lane end where the preceding vehicle Vah is traveling, on the basis of information about the three-dimensional objects transmitted from the detection means 2 (Step S8 in FIG. 11).

When another vehicle exists in the adjacent traveling lane (Step S8; YES), since the subject vehicle should be kept away from the traffic line, the traveling-target-point setting means 3 corrects the calculated offset amount Ox so as to increase the absolute value thereof (Step S9).

The offset amount Ox is corrected, for example, by adding a fixed value to the calculated offset amount Ox, subtracting the fixed value from the offset amount Ox, or multiplying the offset amount Ox by a constant so that the absolute value of the offset amount Ox increases. When another vehicle is not traveling in the adjacent traveling lane (Step S8; NO), the operation in Step S9 is skipped.

As described above, the traveling-target-point setting means 3 calculates or corrects the offset amount Ox, and sets a traveling target point M at a position offset by the offset amount Ox from the position of the preceding vehicle Vah, that is, the center of gravity G of the preceding vehicle Vah, as shown in FIGS. 15A and 15B (Step S10 in FIG. 11).

Figure 18:
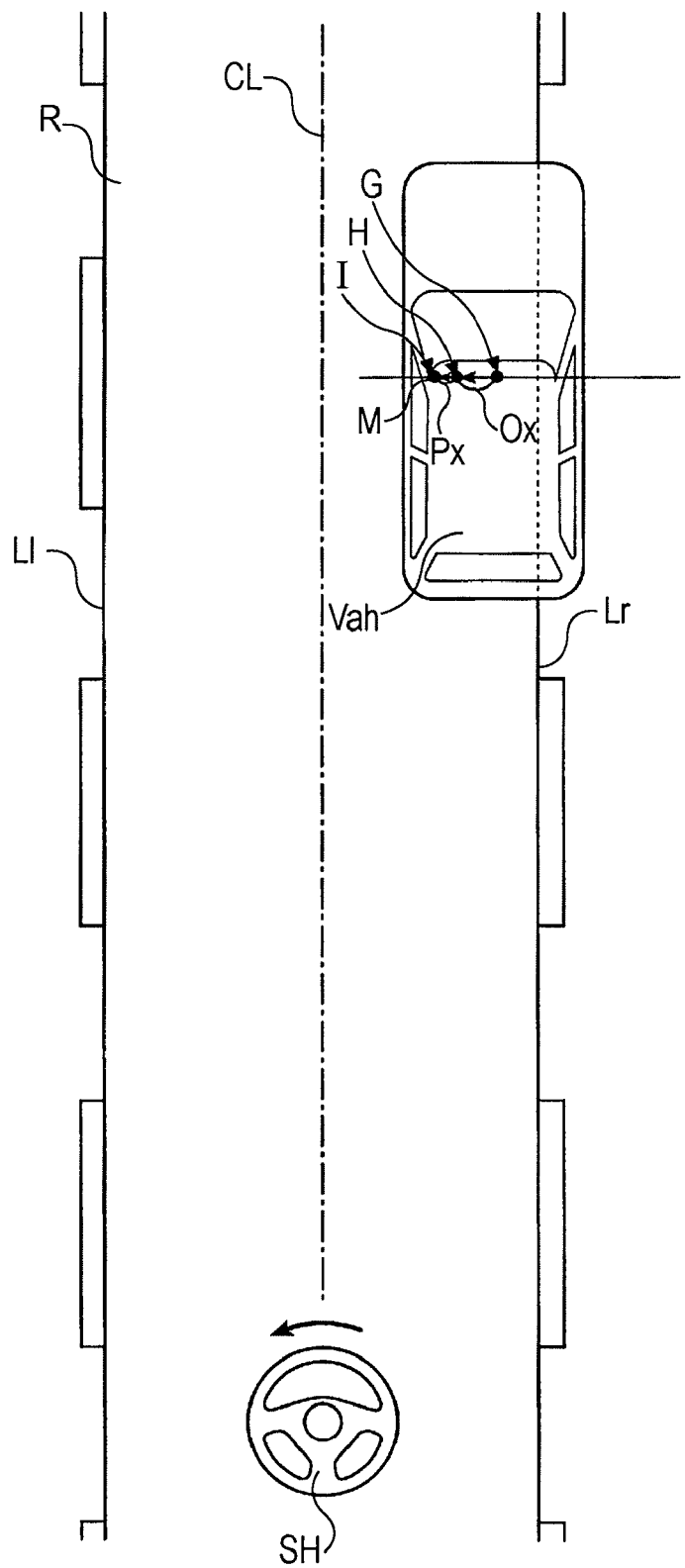
FIG. 18 explains that the traveling target point is further shifted when a steering wheel of the subject vehicle is turned.

In this embodiment, when the driver of the subject vehicle turns a steering wheel SH, the traveling-target-point setting means 3 further shifts the traveling target point M, which has been thus set, in a direction in which steering torque is input, as shown in FIG. 18.

This shifting is performed for the following reason: When a traveling target point M is set, steering control for following the preceding vehicle is performed so that the subject vehicle passes over the traveling target point M, as will be described below. Since it is considered that the driver further turns the steering wheel SH in order to adapt driving of the subject vehicle better to a driving environment, a setting position I of the traveling target point M is set in a state in which the element of the input steering torque is reflected.

Accordingly, the traveling-target-point setting means 3 first monitors steering torque transmitted from a torque sensor provided in a steering-wheel section in the sensors Q (see FIG. 1), and determines whether or not the driver has turned the steering wheel SH (Step S11 in FIG. 12).

When the traveling-target-point setting means 3 determines that the driver has turned the steering wheel SH (Step S11; YES), it then calculates an offset amount Px of the set traveling target point M in the input direction of the steering torque so as to shift the traveling target point M in the input direction of the steering torque in accordance with the steering torque (Step S12).

In the following description, the offset amount Px of the traveling target point M in the input direction of the steering torque is noted as a moving amount Px so as to be distinguished from the above-described offset amount Ox. Further, the moving amount Px has a positive value when the steering wheel SH is turned to the right, and has a negative value when the steering wheel SH is turned to the left.

In this embodiment, the traveling-target-point setting means 3 sets the moving amount Px of the traveling target point M in the input direction of the steering torque at a value that is proportional to a time integration value of a steering torque input by the turn of the steering wheel SH by the driver of the subject vehicle. In short, the moving amount Px (mm) is given by the following Expression (11):

$$P_x = G_{strq} \int f_{strq} dt \tag{11}$$

where fstrq (Nm) represents the input steering torque, and $G_{strq}$ (mm/Nm·s) represents the input torque gain (proportional constant).

The offset amount Ox of the traveling target point M changes according to the positions dpl(r) and dpl(l) of the center of gravity G of the preceding vehicle Vah with respect to the right traffic line Lr and the left traffic line Ll, as described above (see Expressions (9) and (10)). For this reason, when the center of gravity G of the preceding vehicle Vah comes out of the predetermined ranges from the right traffic line Lr and the left traffic line Ll, the offset amount Ox becomes zero.

Figure 19:
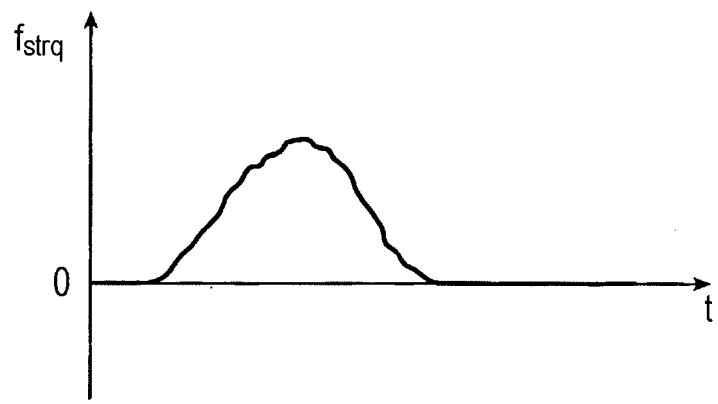
FIG. 19 is a graph showing an example of a change with time in input steering torque.

However, as described above, the moving amount Px of the traveling target point M is proportional to the time integration value of the steering torque fstrq input by the turn of the steering wheel SH by the driver of the subject vehicle. For this reason, as shown in FIG. 19 serving as a graph indicating the change in input steering torque fstrq with time, even when the driver of the subject vehicle returns the steering wheel SH, the moving amount Px of the traveling target point M, which is proportional to the time integration value of the input steering torque fstrq, does not always return to zero.

In this way, the moving amount Px of the traveling target point M stores the history of turns of the steering wheel SH made by the driver in order to adapt driving of the subject vehicle better to the driving environment. By further shifting the traveling target point M by the moving amount Px that is proportional to the time integration value of the input steering torque fstrq, steering control for following the preceding vehicle can be achieved in a state that is more suited to the preference of the driver.

Figure 20A:
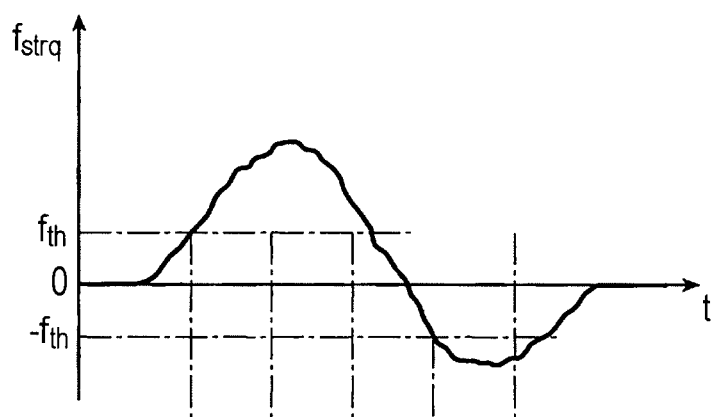
FIG. 20A is a graph showing an example of a change with time in input steering torque, and FIG. 20B explains that the input steering torque is increased or decreased by a fixed amount.
Figure 20B:
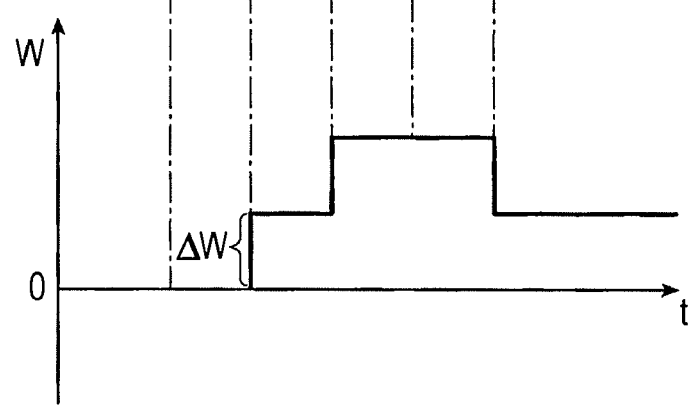

The method for calculating the moving amount Px of the traveling target point M is not limited to the above-described method in this embodiment. For example, a threshold value fth can be set beforehand for the absolute value of the input steering torque fstrq generated by the turn of the steering wheel SH by the driver, and every time a state in which the absolute value of the input steering torque fstrq is more than or equal to the threshold value fth continues for a predetermined time Δt, as shown in FIG. 20A, time integration can be performed while increasing or decreasing the steering torque fstrq by a fixed value ΔW in accordance with the sign of the steering torque fstrq, as shown in FIG. 20B. Then, the moving amount Px of the traveling target point M can be set to be proportional to the time integration value W.

In this case, since the position of the traveling target point M shifts by a fixed amount in proportion to the fixed value ΔW when the steering wheel SH is turned, it is unnecessary for the driver to finely adjust the steering angle of the steering wheel SH in order to adjust the position of the traveling target point M. Further, since the target traveling position M shifts by the fixed amount at a fixed timing when the steering wheel SH is turned in a direction in which the traveling target point M is to be shifted, the driver can easily and clearly shift the traveling target point M.

For example, when the driver turns the steering wheel SH to the right and the time integration value of the input steering torque fstrq becomes positive in a condition shown in FIG. 15A, the traveling target point M, which is offset from the center of gravity G of the preceding vehicle Vah toward the center CL of the traveling lane R is moved farther away from the center CL by the turn of the steering wheel SH. Therefore, although the traveling target point M has been offset so that the subject vehicle does not run out of the right traffic line Lr, the subject vehicle may run out of the right traffic line Lr.

For this reason, in this embodiment, in a case in which the traveling target point M is shifted by the calculated moving amount Px, when the distance between the traveling target point M and the traffic line, that is, the absolute value of dpl(r) or dpl(l) is smaller than half the width of the subject vehicle, the traveling-target-point setting means 3 corrects the moving amount Px so that the distance between the traveling target point M and the traffic line equals half the width of the subject vehicle, and performs control so that the subject vehicle, which should pass over the traveling target point M, will not run out of the traffic line.

Next, the traveling-target-point setting means 3 determines, on the basis of information about the three-dimensional objects transmitted from the detection means 2, whether or not another vehicle is traveling in a traveling lane that is adjacent to the traveling lane of the subject vehicle in a direction opposite the input direction of the steering torque (Step S13 in FIG. 12).

When another vehicle is traveling in the adjacent traveling lane (Step S13; YES), the subject vehicle should be kept away from the traffic line. Therefore, the traveling-target-point setting means 3 corrects the calculated moving amount Px so as to further increase the absolute value thereof (Step S14).

Further, the traveling-target-point setting means 3 monitors changes with time in information about the three-dimensional objects transmitted from the detection means 2, and determines whether or not an object (three-dimensional object), which enters a region between the subject vehicle and the preceding vehicle Vah sideways from a direction opposite the direction in which the steering torque is input by the turn of the steering wheel SH by the driver, is detected (Step S15).

When the entry of an object is detected (Step S15; YES), the subject vehicle should be kept away from the object. Therefore, the traveling-target-point setting means 3 corrects the calculated moving amount Px so as to further increase the absolute value thereof (Step S16).

The moving amount Px is corrected, for example, by adding a fixed value to the moving amount Px, subtracting the fixed value from the moving amount Px, or multiplying the moving amount Px by a constant so as to increase the absolute value of the moving amount Px. When another vehicle is not traveling in the adjacent traveling lane (Step S13; NO) or when the entry of an object is not detected (Step S15; NO), the operation in Step S14 or Step S16 is skipped.

Then, as shown in FIG. 18, the traveling-target-point setting means 3 sets a traveling target point M at a position I further shifted by the moving amount Px from the position H that has been offset by the offset amount Ox from the center of gravity G of the preceding vehicle Vah (Step S17 in FIG. 12).

In this case, as described above, a value that is proportional to the time integration value of the steering torque fstrq input by the turn of the steering wheel SH by the driver of the subject vehicle is set as the moving amount Px. When the driver continues turning the steering wheel SH, the moving amount Px continues increasing or decreasing. However, since the moving amount Px is originally used to set the traveling target point M necessary for steering control for following the preceding vehicle, the traveling target point M to be set on the basis of the moving amount Px should not be set far from the preceding vehicle Vah.

The moving amount Px of the traveling target point M stores the history of turns of the steering wheel SH made by the driver in order to adapt driving of the subject vehicle better to the driving environment, as described above. For this reason, when the moving amount Px of the traveling target point M does not become zero even after the preceding vehicle Vah comes out of the predetermined range from the traffic line and the necessity to offset the traveling target point M is eliminated (that is, the offset amount Ox becomes zero), the traveling target point M is thereby displaced from the center of gravity G of the preceding vehicle Vah.

In this embodiment, in a case in which the traveling target point M is shifted from the center of gravity G of the preceding vehicle Vah on the basis of the moving amount Px calculated and corrected in the operation of Step 17, when the traveling target point M comes out of the left end or the right end of the preceding vehicle Vah, the traveling-target-point setting means 3 limits the moving amount Px so that the traveling target point M is inside the left end or the right end of the preceding vehicle Vah.

In other words, when the absolute value of the moving amount Px is more than half the width of the detected preceding vehicle Vah, the traveling-target-point setting means 3 corrects the moving amount Px so that the absolute value thereof equals half the vehicle width, and then sets a traveling target point M at a position I further shifted by the moving amount Px from the position H that has been offset by the offset amount Ox from the center of gravity G of the preceding vehicle Vah (Step S17).

In short, the traveling-target-point setting means 3 sets the traveling target point M at the coordinates (Xg+Ox+Px, Zg) obtained by adding the offset amount Ox and the moving amount Px to the X-coordinate Xg in the coordinates (Xg, Zg) in real space of the preceding vehicle Vah detected by the preceding-vehicle detecting means 2b.

When the traveling-target-point setting means 3 determines in Step S11 that the steering wheel SH is not turned by the driver (Step S1; NO), it does not calculate and correct a moving amount Px in the current sampling period, but sets the traveling target point M on the basis of the moving amount Px held in the previous sampling period, similarly to the above (Step S17).

The traveling-target-point setting means 3 stores, in the memory (not shown), the offset amount Ox, the moving amount Px, and the coordinates (Xg+Ox+Px, Zg) of the traveling target point M calculated and corrected, as described above. Further, the traveling-target-point setting means 3 outputs the coordinates (Xg+Ox+Px, Zg) of the traveling target point M to the steering control means 4 (see FIG. 1).

The steering control means 4 includes a PID control means and an electric power steering control device that are of a known type and are not shown, and controls steering so that the subject vehicle passes over the traveling target point M, on the basis of the transmitted coordinates (Xg+Ox+Px, Zg) of the traveling target point M.

In the following, the coordinates of the traveling target point M are designates as (Xm, Zm). That is, the coordinates (Xm, Zm) are given by the following Expressions (12) and (13):

$$Xm = Xg + Ox + Px \tag{12}$$

$$Zm = Zg \tag{13}$$

Since the following configuration has been described in detail in the above-described Patent Document 1 filed earlier by the present applicant, it will be briefly described below.

In order for the subject vehicle to pass over the traveling target point M, the steering control means 4 calculates a target steering angle St by the PID control means (Step S18 in FIG. 12), and calculates and sends a power steering instruction current ic to the electric power steering control device, so that the electric power steering control device controls steering so that the subject vehicle passes over the traveling target point M (Step S19).

More specifically, the PID control means calculates a target traveling radius Rt on the basis of the coordinates (Xm, Zm) of the traveling target point M according to the following Expression (14):

$$Rt = (Xm^2 + Zm^2)/(2 \cdot Xm) \tag{14}$$

Then, the PID control means calculates a target steering angle St on the calculated target traveling radius Rt according to the following Expression (15):

$$St = (Lwb \cdot Ns)/Rt \tag{15}$$

where Lwb represents the wheel base, and Ns represents the steering gear ratio.

Subsequently, the PID control means calculates a power steering instruction current ic on the basis of the target steering angle St according to the following Expression (16):

$$ic = Gss \cdot (St - Sr) + Gvs \cdot \frac{d}{dt}(St - Sr) + Ghs \cdot \int (St - Sr)dt \qquad (16)$$

where Sr represents the actual steering angle, that is, the value (δ/Ns) obtained by dividing the steering angle δ of the steering wheel SH transmitted from the steering sensor in the sensors Q (see FIG. 1) by the steering gear ratio Ns, Gss represents the proportional gain, Gvs represents the derivative gain, and Ghs represents the integral gain.

The PID control means in the steering control means 4 transmits the power steering instruction current ic thus calculated to the electric power steering control device.

The electric power steering control device in the steering control means 4 controls the steering wheel SH, for example, by driving a motor (not shown) on the basis of the transmitted power steering instruction current ic (Step S19 in FIG. 12), and performs steering control for following the preceding vehicle so that the subject vehicle passes over the above-described traveling target point M.

As described above, according to the steering assist system 1 of this embodiment, on the basis of the positional relationship between the preceding vehicle Vah and the right traffic line Lr or the left traffic line Ll, when the preceding vehicle Vah is traveling near the center CL of the traveling lane R apart from the right and left traffic lines Lr and Ll, a traveling target point M is set at a normal setting position, for example, at the center of gravity G of the preceding vehicle Vah. When the preceding vehicle Vah is traveling in a predetermined range near the right traffic line Lr or the left traffic line Ll, a traveling target point M is set at a position shifted from the normal setting position toward the center CL of the traveling lane R.

For this reason, the subject vehicle can be caused to follow the preceding vehicle Vah, which is traveling near or over the right traffic line Lr or the left traffic line Ll, in a position slightly closer to the center CL of the traveling lane R. This allows the subject vehicle to follow the preceding vehicle Vah without giving any feeling of insecurity to the driver.

When the preceding vehicle Vah is traveling near or over the right traffic line Lr or the left traffic line Ll, the traveling target point M of the subject vehicle is not set at the center CL of the traveling lane R, but can be offset to a position that prevents the subject vehicle from running out of the traffic line. Therefore, the traveling direction of the subject vehicle is not rapidly changed, and steering control for following the preceding vehicle can be continued while the traveling target point is determined at an appropriate position, without giving any feeling of discomfort to the driver.

Further, in a condition in which the preceding vehicle Vah is approaching one of the traffic lines from the center CL of the traveling lane R, the driver normally drives the subject vehicle toward a side of the preceding vehicle Vah slightly shifted toward the center CL of the traveling lane R. In contrast, in a condition in which the preceding vehicle Vah is traveling over the traffic line or almost outside the traffic line, the driver normally drives the subject vehicle toward a side of the preceding vehicle Vah greatly shifted toward the center CL of the traveling lane R.

For this reason, by setting the offset amount Ox of the traveling target point M so that the absolute value thereof increases as the preceding vehicle Vah moves farther away from the center CL of the traveling lane R, steering control for following the preceding vehicle can be naturally performed in a condition suited to the feeling of the driver without giving any feeling of insecurity and discomfort to the driver.

The ranges of the values dpl(r) and dpl(l) in Expressions (7) and (8) described above and the values of the coefficients and sections in Expressions (9) and (10) described above are not limited to the above-described values, and can be appropriately and experimentally set on the basis of the dimensions and traveling performance depending on the vehicle or vehicle type.

What is claimed is:

1. A steering assist system comprising:
   traffic-line detecting means for detecting right and left traffic lines marked on a road;
   preceding-vehicle detecting means for detecting a preceding vehicle traveling ahead of a subject vehicle;
   traveling-target-point setting means for setting a traveling target point for traveling of the subject vehicle at a predetermined position in the preceding vehicle when the preceding vehicle is not within predetermined ranges from the right and left traffic lines, and for setting the traveling target point at a position offset from the predetermined position in the preceding vehicle toward the center of a traveling lane of the subject vehicle when the preceding vehicle is within the predetermined range of any one of the right and left traffic lines; and
   steering control means for controlling steering so that the subject vehicle passes over the traveling target point, wherein
   an offset amount of the traveling target point is calculated according to the following expression when the preceding vehicle is traveling near the right traffic line:

$$O_x = -\frac{RT1}{RT2} \cdot d_{pl}(r) - RT1,$$

an offset amount is calculated according to the following expression when the preceding vehicle is traveling near the left traffic line:

$$O_x = -\frac{RT1}{RT2} \cdot d_{pl}(l) + RT1, \quad \text{and}$$

where a right side in a width direction of the subject vehicle is a positive side, $O_x$ represents the offset amount, RT1 represents the absolute value of an offset amount when the preceding vehicle is traveling on the respective right or left traffic line, RT2 represents the absolute value of a distance from the respective right or left traffic line to an end of the predetermined range for said respective traffic line, and $d_{pl}(r)$ and $d_{pl}(l)$ respectively represent positions of the preceding vehicle relative to the right and left traffic lines in the width direction of the subject vehicle, and satisfy the following conditions:

$$-RT2 \leq d_{pl}(r) \leq RT2, \text{ and}$$

$$-RT2 \leq d_{pl}(l) \leq RT2.$$

2. The steering assist system according to claim 1, wherein the predetermined range extends from a position a predetermined first distance apart from a respective traffic line in a direction toward the center of the traveling lane of the subject vehicle, to a position a predetermined second distance apart from the respective traffic line in a direction opposite the center of the traveling lane of the subject vehicle.

3. The steering assist system according to claim 2, wherein an offset amount of the traveling target point is set so that the absolute value of the offset amount increases as the preceding vehicle moves farther away from the center of the traveling lane of the subject vehicle.

4. The steering assist system according to claim 3, wherein
RT1=1100, and
RT2=1300.

5. The steering assist system according to claim 1, wherein the traveling-target-point setting means sets the traveling target point at the predetermined position in the preceding vehicle without offsetting the traveling target point when it is determined that the preceding vehicle is within both the predetermined ranges from the detected right and left traffic lines.

6. The steering assist system according to claim 1, wherein the traveling-target-point setting means sets the traveling target point at the predetermined position in the preceding vehicle without offsetting the traveling target point when a distance between the detected right and left traffic lines is less than a preset threshold value.

7. A steering assist system comprising:
traffic-line detecting means for detecting right and left traffic lines marked on a road;
preceding-vehicle detecting means for detecting a preceding vehicle traveling ahead of a subject vehicle;
traveling-target-point setting means for setting a traveling target point for traveling of the subject vehicle at a predetermined position in the preceding vehicle when the preceding vehicle is not within predetermined ranges from the right and left traffic lines, and for setting the traveling target point at a position offset from the predetermined position in the preceding vehicle toward the center of a traveling lane of the subject vehicle when the preceding vehicle is within the predetermined range of any one of the right and left traffic lines; and
steering control means for controlling steering so that the subject vehicle passes over the traveling target point, and
wherein an offset amount of the traveling target point is corrected so as to increase the absolute value of the offset amount when another vehicle is detected in a traveling lane adjacent to the traveling lane of the subject vehicle.

8. The steering assist system according to claim 1, wherein, when a steering wheel is turned, the traveling-target-point setting means sets the traveling target point at a position offset in an input direction of steering torque input by the turn.

9. The steering assist system according to claim 8, wherein an offset amount of the traveling target point in the input direction of the steering torque is set to be proportional to a time integration value of the input steering torque.

10. The steering assist system according to claim 8, wherein an offset amount of the traveling target point in the input direction of the steering torque is set to be proportional to a value obtained by subjecting the input steering torque to time integration while increasing or decreasing the input steering torque by a fixed value in accordance with the sign of the input steering torque when a state in which the absolute value of the input steering torque is more than or equal to a preset threshold value continues for a predetermined time.

11. The steering assist system according to claim 8, wherein an offset amount of the target traveling point in the input direction of the steering torque is within a range to a left end or a right end of the preceding vehicle.

12. The steering assist system according to claim 8, wherein an offset amount of the target traveling point in the input direction of the steering torque is within a range that prevents the subject vehicle from running out of the traffic lines when steering is controlled so that the subject vehicle passes over the traveling target point.

13. A steering assist system comprising:
traffic-line detecting means for detecting right and left traffic lines marked on a road;
preceding-vehicle detecting means for detecting a preceding vehicle traveling ahead of a subject vehicle;
traveling-target-point setting means for setting a traveling target point for traveling of the subject vehicle at a predetermined position in the preceding vehicle when the preceding vehicle is not within predetermined ranges from the right and left traffic lines, and for setting the traveling target point at a position offset from the predetermined position in the preceding vehicle toward the center of a traveling lane of the subject vehicle when the preceding vehicle is within the predetermined range of any one of the right and left traffic lines; and
steering control means for controlling steering so that the subject vehicle passes over the traveling target point, wherein
when a steering wheel is turned, the traveling-target-point setting means sets the traveling target point at a position offset in an input direction of steering torque input by the turn, and
an offset amount of the traveling target point in the input direction of the steering torque is set so that the absolute value of the offset amount is more than a normal value when another vehicle is detected in a traveling lane adjacent to the traveling lane of the subject vehicle in a direction opposite the input direction of the steering torque.

14. The steering assist system according to claim 8, wherein an offset amount of the traveling target point in the input direction of the steering torque is set so that the absolute value of the offset amount is more than a normal value when an object that enters a region between the subject vehicle and the preceding vehicle sideways from a direction opposite the input direction of the steering torque.

* * * * *